PATENT

US 11,910,357 B2

(12) United States Patent
Abotabl et al.

(10) Patent No.: US 11,910,357 B2
(45) Date of Patent: Feb. 20, 2024

(54) FULL DUPLEX SIDELINK UE INDICATION OF SELECTED SIDELINK RESOURCES FOR OVERCOMING SELF-INTERFERENCE

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Krishna Kiran Mukkavilli, San Diego, CA (US); Seyedkianoush Hosseini, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 17/318,967

(22) Filed: May 12, 2021

(65) Prior Publication Data
US 2022/0369287 A1    Nov. 17, 2022

(51) Int. Cl.
*H04W 72/02* (2009.01)
*H04L 1/00* (2006.01)
(Continued)

(52) U.S. Cl.
CPC .......... *H04W 72/02* (2013.01); *H04L 1/0003* (2013.01); *H04W 72/0473* (2013.01); *H04W 72/56* (2023.01); *H04W 72/563* (2023.01)

(58) Field of Classification Search
CPC ... H04W 72/02; H04W 72/56; H04W 72/563; H04W 72/0473; H04L 1/0003
See application file for complete search history.

(56) References Cited

U.S. PATENT DOCUMENTS

2020/0314915 A1* 10/2020 Lin .................. H04W 72/56
2020/0336872 A1* 10/2020 Basu Mallick ......... H04W 4/40
(Continued)

OTHER PUBLICATIONS

3GPP TR 37.985: "3rd Generation Partnership Project, Technical Specification Group Radio Access Network, Overall Description of Radio Access Network (RAN) Aspects for Vehicle-to-Everything (V2X) based on LTE and NR (Release 16)", V2.0.0, RP-200708, 3rd Generation Partnership Project, Mobile Competence Centre, 650, Route Des Lucioles, F-06921 Sophia-Antipolis Cedex, France, Jun. 22, 2020, XP051903408, 35 Pages.
(Continued)

*Primary Examiner* — Ajay Cattungal
(74) *Attorney, Agent, or Firm* — Procopio, Cory, Hargreaves & Savitch

(57) ABSTRACT

Aspects of the present disclosure include methods and devices for informing a base station of autonomously selected SL resources to allow the base station to adjust the DL transmission to mitigate the degradation of the reception of a DL transmission due to self-interference that overlaps with a SL transmission. A device may be configured to select resources for a SL transmission and to transmit, in an UL transmission to a base station, an indication of the resources selected for the SL transmission. A base station may be configured to receive, in an UL transmission, an indication of resources selected for a SL transmission from a UE, and to transmit, based on the indication of the resources selected for the SL transmission, at least one DL transmission that overlaps in time with the SL transmission.

30 Claims, 16 Drawing Sheets

(51) Int. Cl.
  *H04W 72/044* (2023.01)
  *H04W 72/56* (2023.01)
  *H04W 72/563* (2023.01)

(56) References Cited

U.S. PATENT DOCUMENTS

| | | | | |
|---|---|---|---|---|
| 2020/0337083 | A1* | 10/2020 | Loehr | H04W 74/0808 |
| 2021/0022142 | A1* | 1/2021 | Wu | H04W 72/56 |
| 2021/0050950 | A1* | 2/2021 | Zhou | H04W 76/14 |
| 2021/0051005 | A1* | 2/2021 | Kunz | H04W 12/033 |
| 2021/0092789 | A1* | 3/2021 | Basu Mallick | H04W 24/04 |
| 2021/0212106 | A1* | 7/2021 | Farag | H04W 74/002 |
| 2021/0345300 | A1* | 11/2021 | Selvanesan | H04L 5/001 |

OTHER PUBLICATIONS

Ad-Hoc Chair (AT&T): "Session Notes of AI 7.2.11", 3GPP TSG RAN WG1 #102-e, R1-2007207, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 29, 2020, XP051922966, 15 Pages.

International Search Report and Written Opinion—PCT/US2022/027500—ISA/EPO—dated Jul. 21, 2022.

LG Electronics: "Discussion on Resource Allocation for NR Sidelink Mode 1", 3GPP TSG RAN WG1 #98 Meeting, R1-1908901, 3rd Generation Partnership Project, Mobile Competence Centre, 650, Route Des Lucioles, F-06921 Sophia-Antipolis Cedex, vol. RAN WG1, No. Prague, Aug. 26, 2019-Aug. 30, 2019, Aug. 17, 2019, XP051765509, 8 Pages.

VIVO: "Discussion on Coexistence between LTE and NR V2X", 3GPP TSG RAN WG1 Meeting #94bis, R1-1810394, 3rd Generation Partnership Project, Mobile Competence Centre, 650, Route Des Lucioles, F-06921 Sophia-Antipolis Cedex, vol. RAN WG1, No. Chengdu, China, Oct. 8, 2018-Oct. 12, 2018, Sep. 29, 2018, XP051517803, 5 Pages.

* cited by examiner

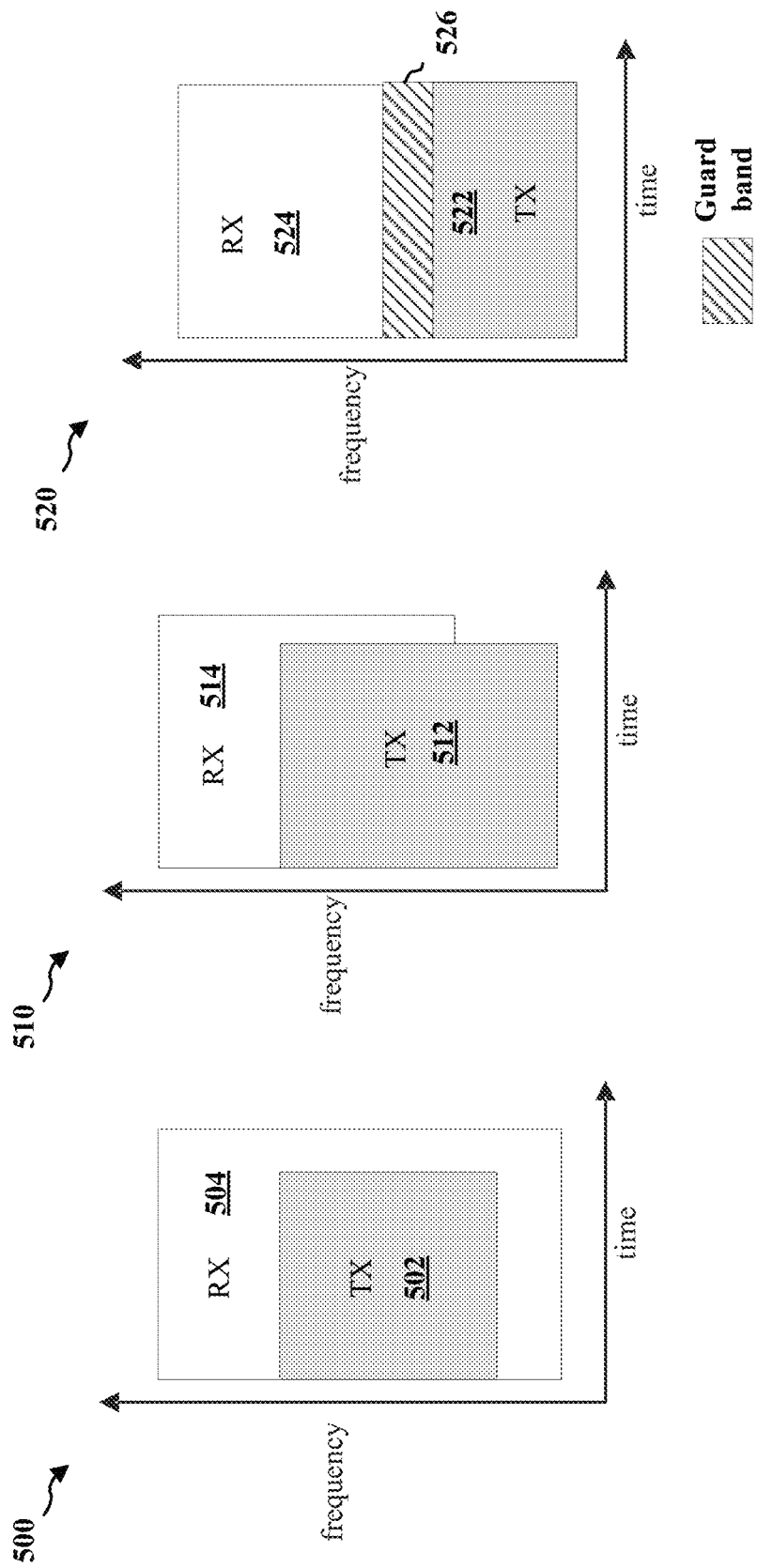

FULL DUPLEX SIDELINK UE INDICATION OF SELECTED SIDELINK RESOURCES FOR OVERCOMING SELF-INTERFERENCE

BACKGROUND

Technical Field

The present disclosure relates generally to communication systems, and more particularly, to sidelink (SL) communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects of wireless communication UEs may autonomously (e.g., not directed by a base station) select resources for SL transmissions. A UE may additionally communicate in a full-duplex (FD) mode in which the UE may transmit SL communication via a SL channel to a second UE while receiving downlink (DL) communication via a DL channel from a base station. A FD mode may be one of an in-band FD (IBFD) mode and a sub-band FDD. For example, in-band full duplex (IBFD) operation may include the transmission and reception of signals at overlapping times and overlapping in frequency. In sub-band FDD, transmission and reception resources may overlap in time using different frequencies, e.g., separated by a guard band. The transmission and reception frequency resources may be close enough that interference cancellation methods are used to cancel interference from the transmitted signal.

A transmission of SL communication via autonomously selected SL resources may cause self-interference for the transmitting UE, where the self-interference may lead to reception degradation for a simultaneous (e.g., overlapping at least partially in time) DL transmission. Aspects presented herein provide for informing a base station of autonomously selected SL resources, which may allow the base station to adjust the DL transmission to mitigate the reception degradation of the DL transmission due to self-interference from the SL transmission.

In an aspect of the disclosure, a method, a computer-readable medium, and an apparatus are provided. The apparatus may be a device at a UE. The device may be a processor and/or modem at a UE or the UE itself. The UE may be configured to select resources for a SL transmission and to transmit, in an UL transmission to a base station, an indication of the resources selected for the SL transmission. The UE may further be configured to transmit the SL transmission on the resources selected for the SL transmission and to receive a DL transmission from the base station that overlaps in time with the SL transmission. The UE may also be configured to receive multiple configurations of the one or more reception parameters for reception of a DL transmission that overlaps in time with the SL transmission, each configuration associated with a corresponding priority level; to receive a priority level indication of a priority level associated with a scheduled DL transmission that overlaps in time with the SL transmission; and to adjust at least one of reception of the scheduled DL transmission or the SL transmission based on the received indication of the priority level.

In an aspect of the disclosure, a method, a computer-readable medium, and an apparatus are provided. The apparatus may be a device at a base station. The device may be a processor and/or modem at a base station or the base station itself. The base station may be configured to receive, in an UL transmission, an indication of resources selected for a SL transmission from a UE, and to transmit, based on the indication of the resources selected for the SL transmission, at least one DL transmission that overlaps in time with the SL transmission. The base station may also be configured to transmit, to the UE, multiple configurations of one or more transmission parameters for a DL transmission that overlaps in time with the SL transmission, each configuration associated with a corresponding priority level; and to transmit a priority level indication of a priority level associated with the DL transmission that overlaps in time with the SL transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5A illustrates a first example of IBFD resources.

FIG. 5B illustrates a second example of IBFD resources.

FIG. 5C illustrates an example of sub-band full-duplex resources.

DETAILED DESCRIPTION

Figure 1:
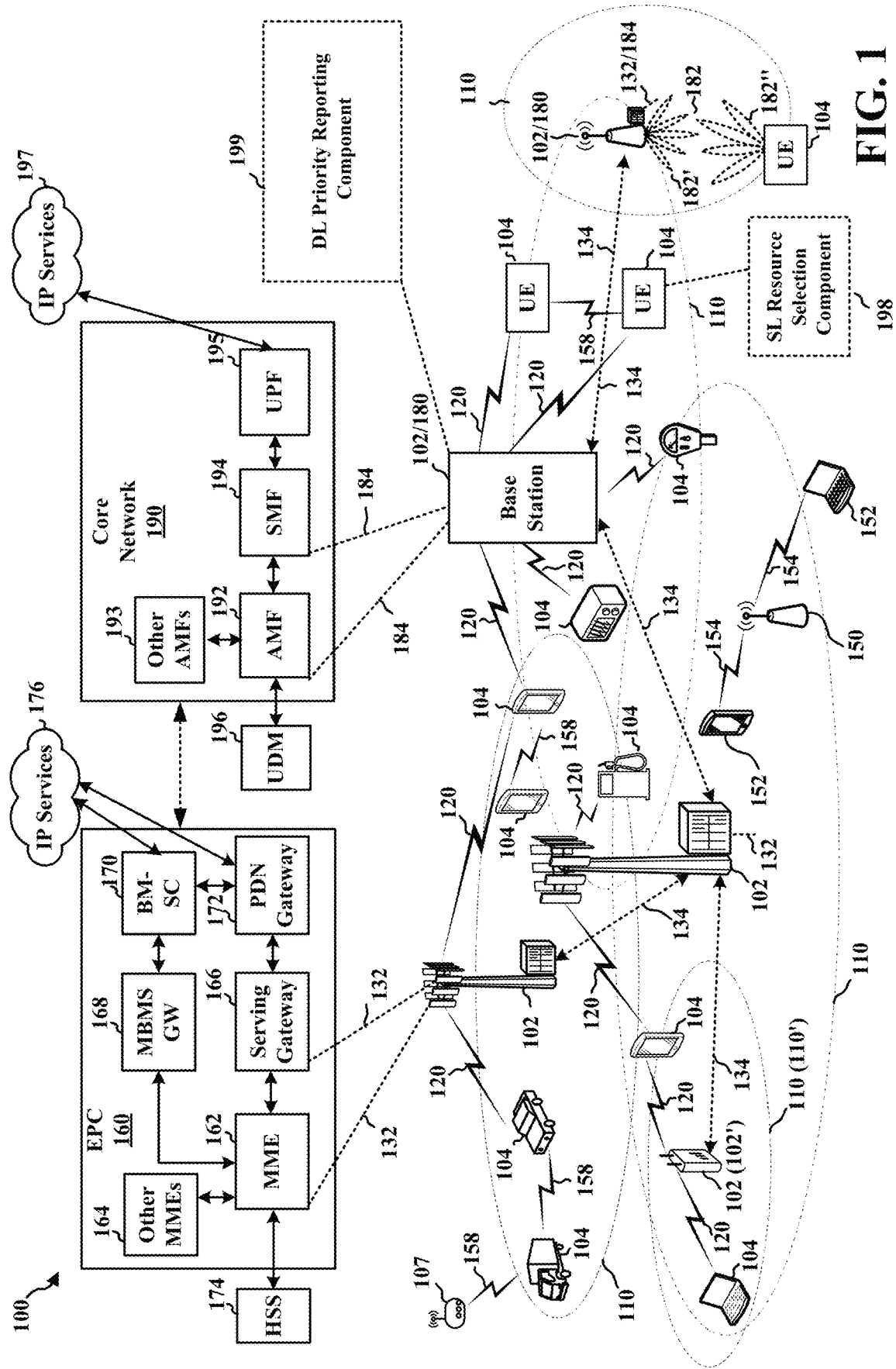
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a UE 104 may include a SL resource selection component 198 that may be configured to select resources for a SL transmission and to transmit, in an UL transmission to a base station, an indication of the resources selected for the SL transmission. In certain aspects, the base station 102 or 180 may include a DL priority reporting component 199 that may be configured to receive, in an UL transmission, an indication of resources selected for a SL transmission from a UE, and to transmit, based on the indication of the resources selected for the SL transmission, at least one DL transmission that overlaps in time with the SL transmission. Although the following description may be focused on 5G NR, the concepts described herein may be applicable to other similar areas, such as LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
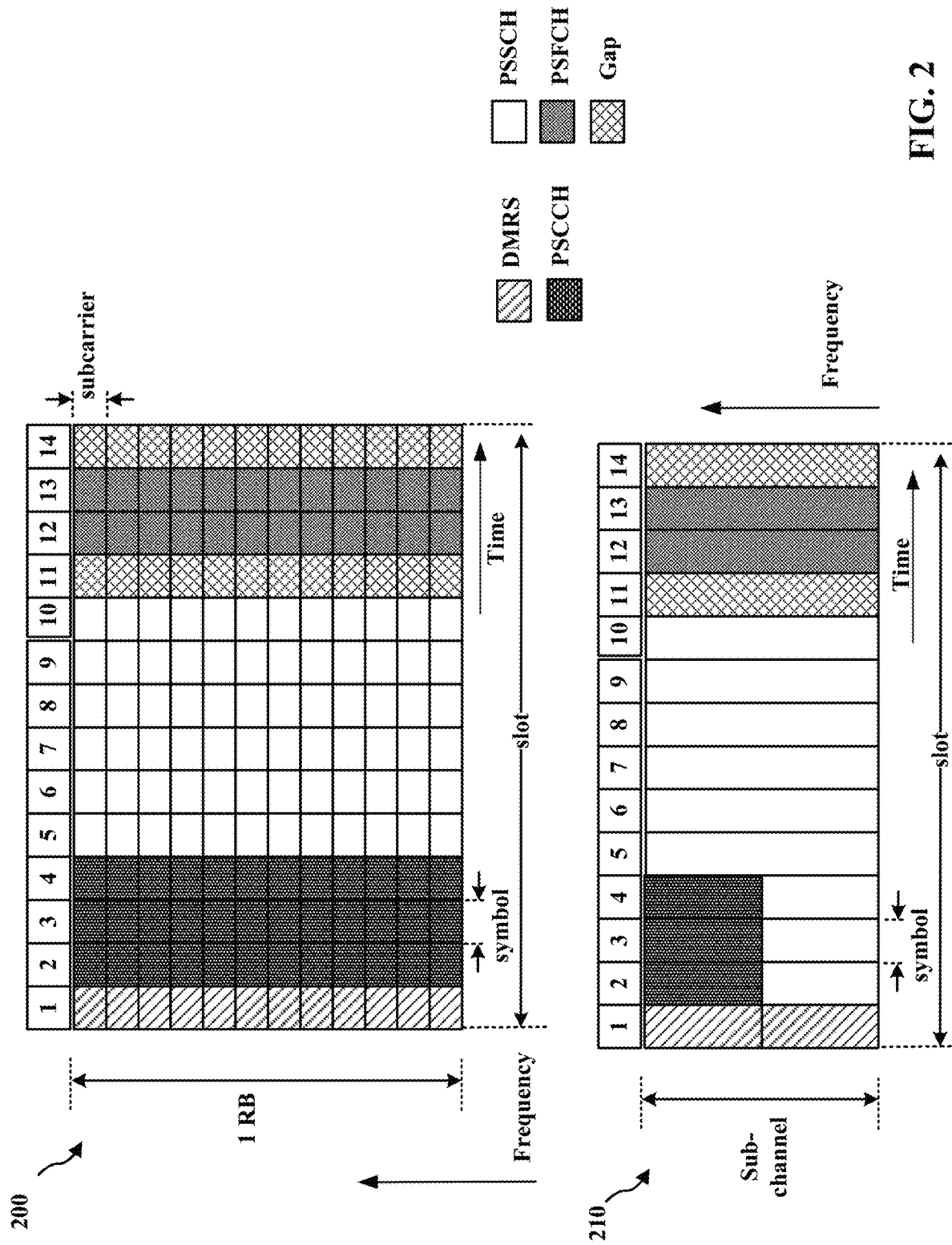
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols may be CP orthogonal frequency division multiplexing (OFDM) (CP-OFDM) symbols. The symbols may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIG. 2 provides an example of normal CP with 14 symbols per slot. Within a set of frames, there may be one or more different bandwidth parts (BWPs) that are frequency division multiplexed. Each BWP may have a particular numerology and CP (normal or extended).

Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A minimum resource allocation unit may be a sub-channel in frequency. A resource allocation in time may be based on a slot. Sidelink communication may be transmitted or received based on one or more resource pools. In some aspects, sidelink communication may be exchanged in transmission or reception resource pools. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
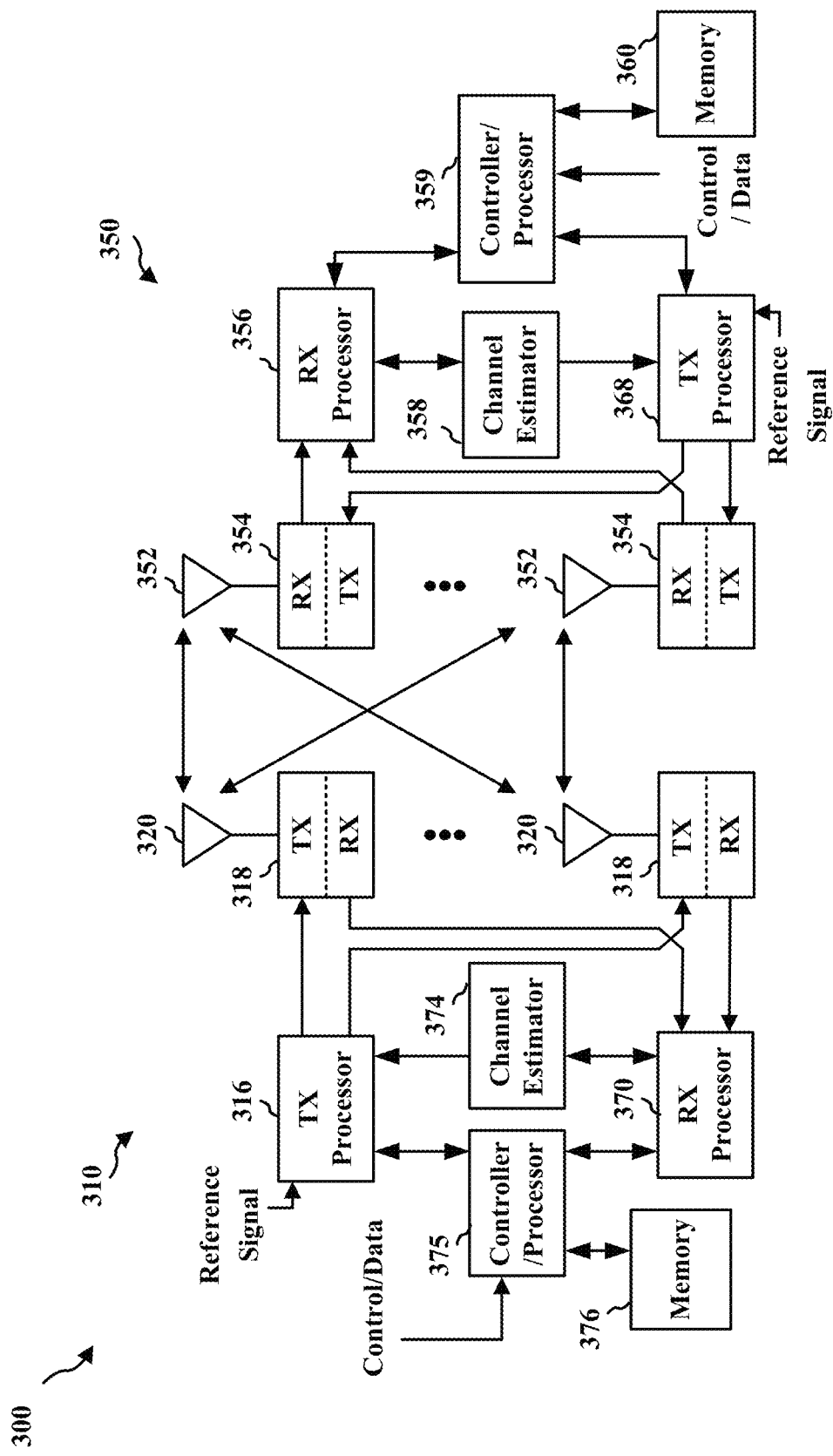
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350. The communication may be based on sidelink or an access link. In some examples, the devices 310 and 350 may communicate based on V2X or other D2D communication. In other aspects, the devices 310 and 350 may communication over an access link based on uplink and downlink transmissions. The communication may be based on sidelink using a PC5 interface (e.g., between two UEs). The communication may be based on an access link using a Uu interface (e.g., between a base station and a UE). The devices 310 and the 350 may comprise a UE, an RSU, a base station, etc. In some implementations, the device 310 may correspond to a base station and the device 350 may correspond to a UE. In other implementations Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate a radio frequency (RF) carrier with a respective spatial stream for transmission.

At the device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The transmission is processed at the device 310 in a manner similar to that described in connection with the receiver function at the device 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

Wireless communication systems may be configured to share available system resources and provide various telecommunication services (e.g., telephony, video, data, messaging, broadcasts, etc.) based on multiple-access technologies that support communication with multiple users.

Figure 4A:
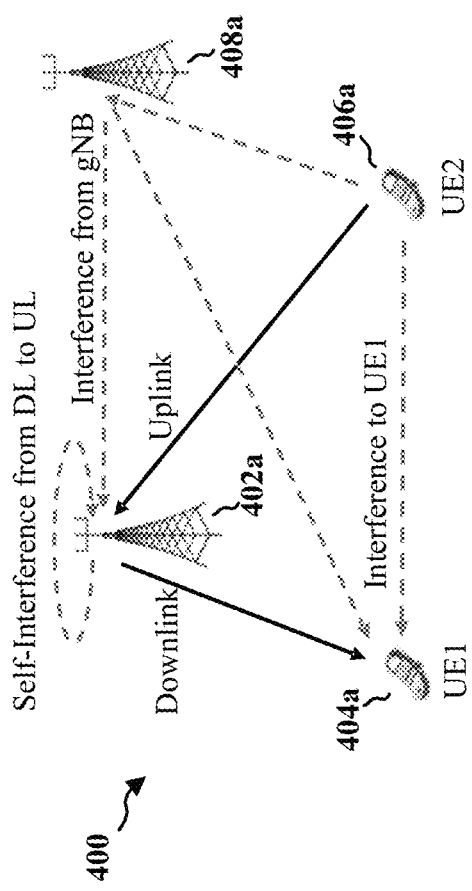
FIG. 4A shows a first example of full-duplex communication in which a first base station is in full duplex communication with a first UE and a second UE.
Figure 4B:
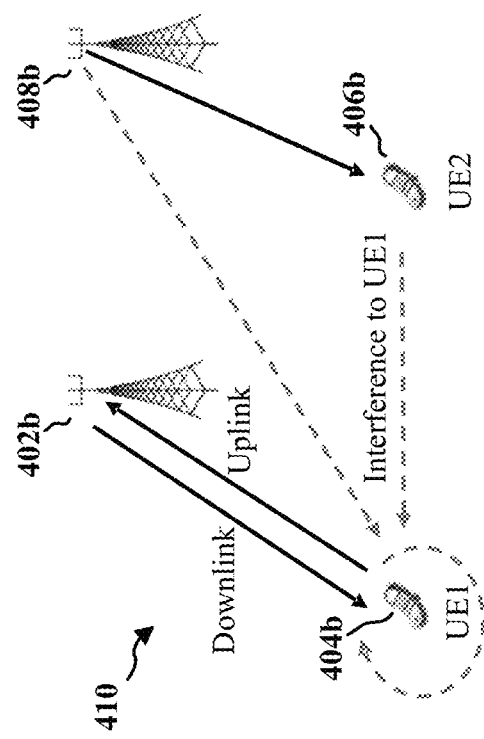
FIG. 4B shows a second example of full-duplex communication in which a first base station is in full-duplex communication with a first UE.
Figure 4C:
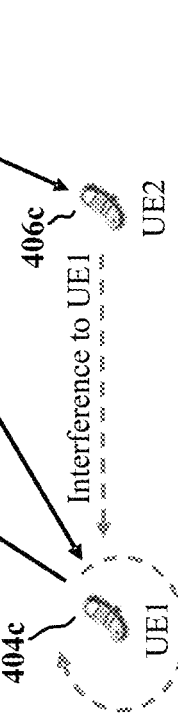
FIG. 4C shows a third example of full-duplex communication in which a first UE is a full-duplex UE in communication with a first base station and a second base station.

FIGS. 4A-4C illustrate various modes of full-duplex communication. Full-duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full-duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full-duplex communication 400 in which a first base station 402a is in full duplex communication with a first UE 404a and a second UE 406a. The first base station 402a is a full-duplex base station, whereas the first UE 404a and the second UE 406a may be configured as either a half-duplex UE or a full-duplex UE. The second UE 406a may transmit a first uplink signal to the first base station 402a as well as to other base stations, such as a second base station 408a in proximity to the second UE 406a. The first base station 402a transmits a downlink signal to the first UE 404a concurrently with receiving the uplink signal from the second UE 406a. The base station 402a may experience self-interference from the receiving antenna that is receiving the uplink signal from UE 406a receiving some of the downlink signal being transmitted to the UE 404a. The base station 402a may experience additional interference due to signals from the second base station 408a. Interference may also occur at the first UE 404a based on signals from the second base station 408a as well as from uplink signals from the second UE 406a.

FIG. 4B shows a second example of full-duplex communication 410 in which a first base station 402b is in full-duplex communication with a first UE 404b. In this example, the first base station 402b is a full-duplex base station and the first UE 404b is a full-duplex UE. The first base station 402b and the UE 404b that can concurrently receive and transmit communication that overlaps in time in a same frequency band. The base station and the UE may each experience self-interference, in which a transmitted signal from the device is leaked to a receiver at the same device. The first UE 404b may experience additional interference based on one or more signals emitted from a second UE 406b and/or a second base station 408b in proximity to the first UE 404b.

FIG. 4C shows a third example of full-duplex communication 420 in which a first UE 404c is a full-duplex UE in communication with a first base station 402c and a second base station 408c. The first base station 402c and the second base station 408c may serve as multiple transmission and reception points (multi-TRPs) for UL and DL communication with the UE 404c. The second base station 408c may be in communication with a second UE 406c. In FIG. 4C, the first UE 404c may concurrently transmit an uplink signal to the first base station 402c while receiving a downlink signal from the second base station 408c. The first UE 404c may experience self-interference as a result of the first signal and the second signal being communicated simultaneously, e.g., the uplink signal may leak to, e.g., be received by, the UE's receiver. The first UE 404c may experience additional interference from the second UE 406c.

FIGS. 5A-5B illustrate a first example 500 and a second example 510 of in-band full duplex (IBFD) resources. FIG. 5C illustrates an example 520 of sub-band full-duplex resources. In IBFD, signals may be transmitted and received in overlapping times and overlapping in frequency. As shown in the first example 500, a time and a frequency allocation of a transmission resources 502 may fully overlap with a time and a frequency allocation of reception resources 504. In the second example 510, a time and a frequency allocation of transmission resources 512 may partially overlap with a time and a frequency of allocation of reception resources 514.

IBFD is in contrast to sub-band FDD, where uplink and downlink resources may overlap in time using different frequencies, as shown in FIG. 5C. As shown in FIG. 5C, the transmission resources 522 are separated from the reception resources 524 by a guard band 526. The guard band may be frequency resources, or a gap in frequency resources, provided between the transmission resources 522 and the DL resources 524. Separating the transmission frequency resources and the DL frequency resources with a guard band may help to reduce self-interference. Transmission resources and reception resources that are immediately adjacent to each other correspond to a guard band width of 0. As an output signal, e.g., from a UE transmitter may extends outside the transmission resources, the guard band may reduce interference experienced by the UE. Sub-band FDD may also be referred to as "flexible duplex". In some aspects, the transmission resources may correspond to UL resources, and the reception resources may correspond to DL resources.

Figure 6:
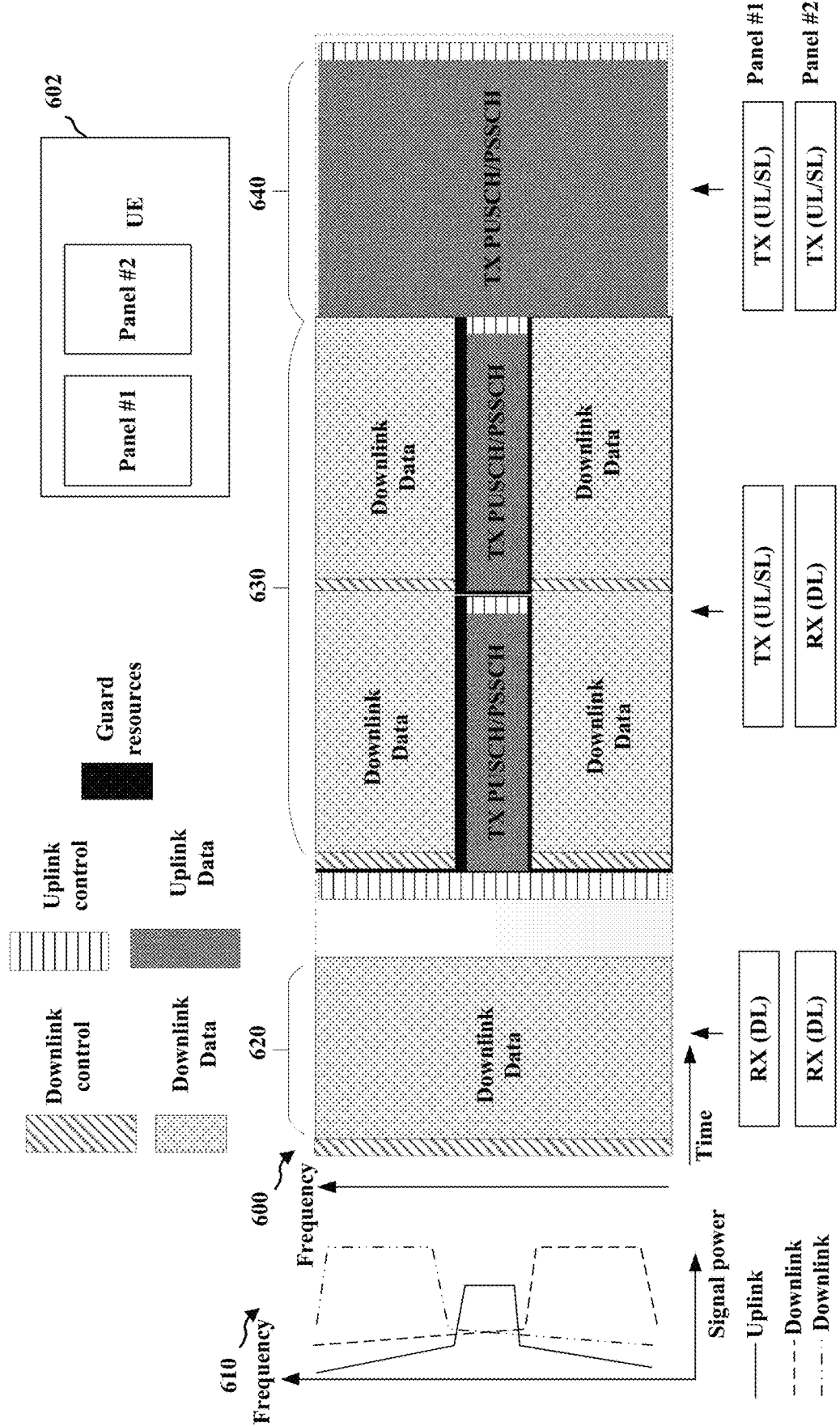
FIG. 6 illustrates an example device that includes separate panels, e.g., antenna panels, for simultaneous transmission and reception in full-duplex operation.

Aspects presented herein help to provide self-interference mitigation. Aspects may help to improve isolation, such as greater than 50 dB. FIG. 6 illustrates an example device 602 that includes separate panels, e.g., antenna panels, for simultaneous transmission and reception in full-duplex operation. Full-duplex operation may include UL transmission and DL reception, sidelink transmission and reception, or sidelink transmission and DL reception, sidelink reception and UL transmission, etc. For example, the device 602 is illustrated as including panel #1 and panel #2. In some examples, panel #1 may be used for transmission, e.g., of PUSCH or PSSCH. The transmission may be at both edges of a frequency band, such as illustrated in 600 and 610. Panel #2 may be for reception, e.g., DL reception or PSSCH reception, such as using frequency resources within a frequency band, such as at a middle of the frequency band. Sub-band full duplex operation, such as described in connection with FIG. 5C may be associated with an isolation of greater than 40 dB. As shown in FIG. 5C, the reception and transmission resources may be in different portions of a frequency band with a guard band between the reception and transmission portions of the frequency band. FIG. 6 illustrates an example set of time and frequency resources 600 that include both half duplex and full duplex periods. For example, the period of time 620 includes half duplex resources for data reception, e.g., panel #1 and panel #2 may both receive downlink data during the period 620. The period of time 620 includes sub-band full-duplex resources for transmissions (e.g., PUSCH/PSSCH) and reception (e.g., downlink data or sidelink data), e.g., panel #1 may receive data and panel #2 may transmit during the period 630. The period of time 640 includes half duplex resources for uplink data, e.g., panel #1 and panel #2 may both transmit (e.g., PUSCH or PSSCH) during the period 640. FIG. 6 also includes a graph 610 showing a signal power over frequency that shows that uplink and downlink signals leak outside of the frequency range provided in the sub-band full-duplex resources of period 630.

In some examples, the receiver may perform windowed overlap and add (WOLA) to reduce the adjacent channel leakage ratio (ACLR) for the leakage of the transmitted signal. An analog low pass filter (LPF) may improve an analog-to-digital conversion (ADC) dynamic range. The receiver automatic gain control (AGC) states may be improved in order to improve the noise figure (NF). Digital interference cancelation of the ACLR leakage, e.g., greater than 20 dB, may be used. In some examples, a non-linear model may be employed for each Tx-Rx pair.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

A minimum resource allocation unit may be a sub-channel in frequency. A resource allocation in time may be based on a slot. Some slots may not be available for sidelink communication. As described in connection with FIG. 2, some slots may include feedback resources. Sidelink communication may be transmitted or received based on one or more resource pool. In some aspects, sidelink communication may be exchanged in transmission or reception resource pools.

Figure 7:
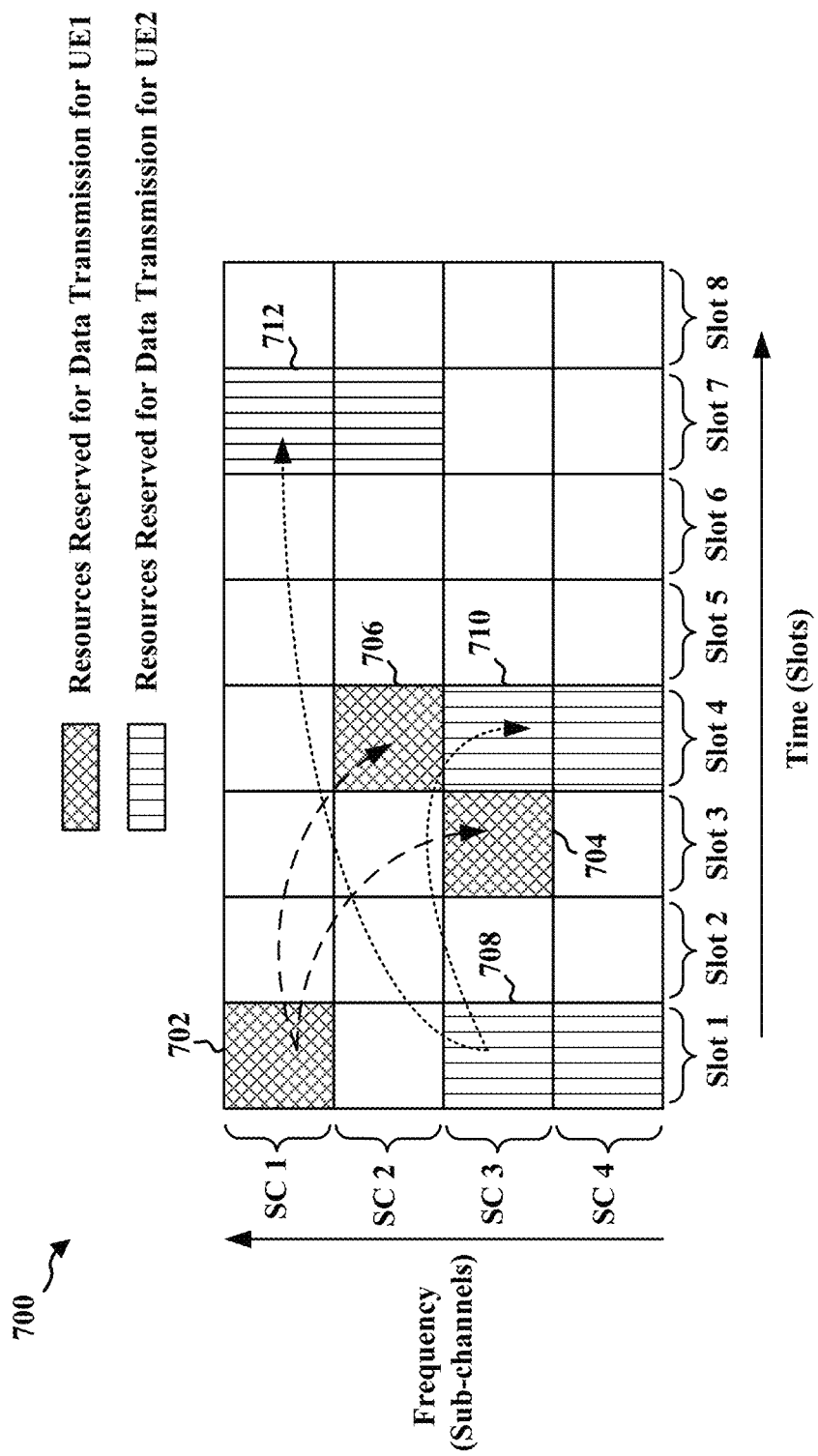
FIG. 7 is an example of time and frequency resources showing reservations for sidelink transmissions.

FIG. 7 is an example 700 of time and frequency resources showing reservations for sidelink transmissions. The resources may be comprised in a sidelink resource pool, for example. The resource allocation for each UE may be in units of one or more sub-channels in the frequency domain (e.g., sub-channels SC1 to SC 4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of a pre-defined slots and sub-channels, such as an 8 time slots by 4 sub-channels window as shown in example 700, which provides 32 available resource blocks in total. This window may also be referred to as a resource selection window.

A first UE ("UE1") may reserve a sub-channel (e.g., SC 1) in a current slot (e.g., slot 1) for its initial data transmission 702, and may reserve additional future slots within the window for data retransmissions (e.g., 704 and 706). For example, UE1 may reserve sub-channels SC 3 at slots 3 and SC 2 at slot 4 for future retransmissions as shown by FIGS. 4A-4C. UE1 then transmits information regarding which resources are being used and/or reserved by it to other UE(s). UE1 may do by including the reservation information in the reservation resource field of the SCI, e.g., a first stage SCI.

FIG. 7 illustrates that a second UE ("UE2") reserves resources in sub-channels SC 3 and SC 4 at time slot 1 for its current data transmission 708, and reserve first data retransmission 710 at time slot 4 using sub-channels SC 3 and SC 4, and reserve second data retransmission 712 at time slot 7 using sub-channels SC 1 and SC 2 as shown by FIG. 7. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIS within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 7 illustrates resources being reserved for an initial transmission and two retransmissions, the reservation may be for an initial transmission and a single transmission or only for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. The RSRP measurement may be for the PSCCH or PSSCH DMRS. In some aspects, the UE may receive a configuration indication whether to base the RSRP measurement on the PSCCH or the PSSCH DMRS. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources. Each reservation of sidelink resources may indicate a priority level, e.g., in the SCI. The UE may further consider the priority level for a reservation when determining whether to exclude the reserved resources from candidate resources for sidelink transmission. For example, the UE may apply an RSRP threshold based on the indicated priority level. For example, the UE may compare the measured RSRP to an RSRP threshold for a transmitter priority and receiver priority pair. The RSRP threshold may increase or decrease based on an amount of available resources in a selection window. As an example, if the percentage of available resources in a selection window is less than 20%, the UE may increase the RSRP threshold and may repeat the process of identifying candidate resources in the selection window. The candidate resource set may refer to the resources in the selection window that are available for a sidelink transmission by the UE.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. In some aspects, the sidelink resources may be selected so that each retransmission of a packet will occur within a packet delay budget (PDB). The UE may reserve the resources by transmitting SCI indicating the resource reservation. For example, in the example in FIG. 7, the UE may transmit SCI reserving resources for data transmissions 708, 710, and 712.

A full duplex UE may transmit PSSCH to another UE in a full-duplex manner while receiving downlink transmissions from a base station. The UE's PSSCH transmission may cause self-interference to the UE's downlink reception. In mode 2 resource allocation, the UE autonomously selects resources for the sidelink transmission rather than the base station allocating resources. The base station may not be aware if the UE will operate in a full-duplex mode including sidelink transmission that overlaps with downlink reception and does not know the time and/or frequency resources that the UE selects for the sidelink transmission. Aspects presented herein provide for the UE to transmit information about planned sidelink communication, such as selected sidelink resources, to the base station. The information enables the base station to adjust the downlink transmission in response to potential self-interference at the UE based on the sidelink transmission.

Figure 8:
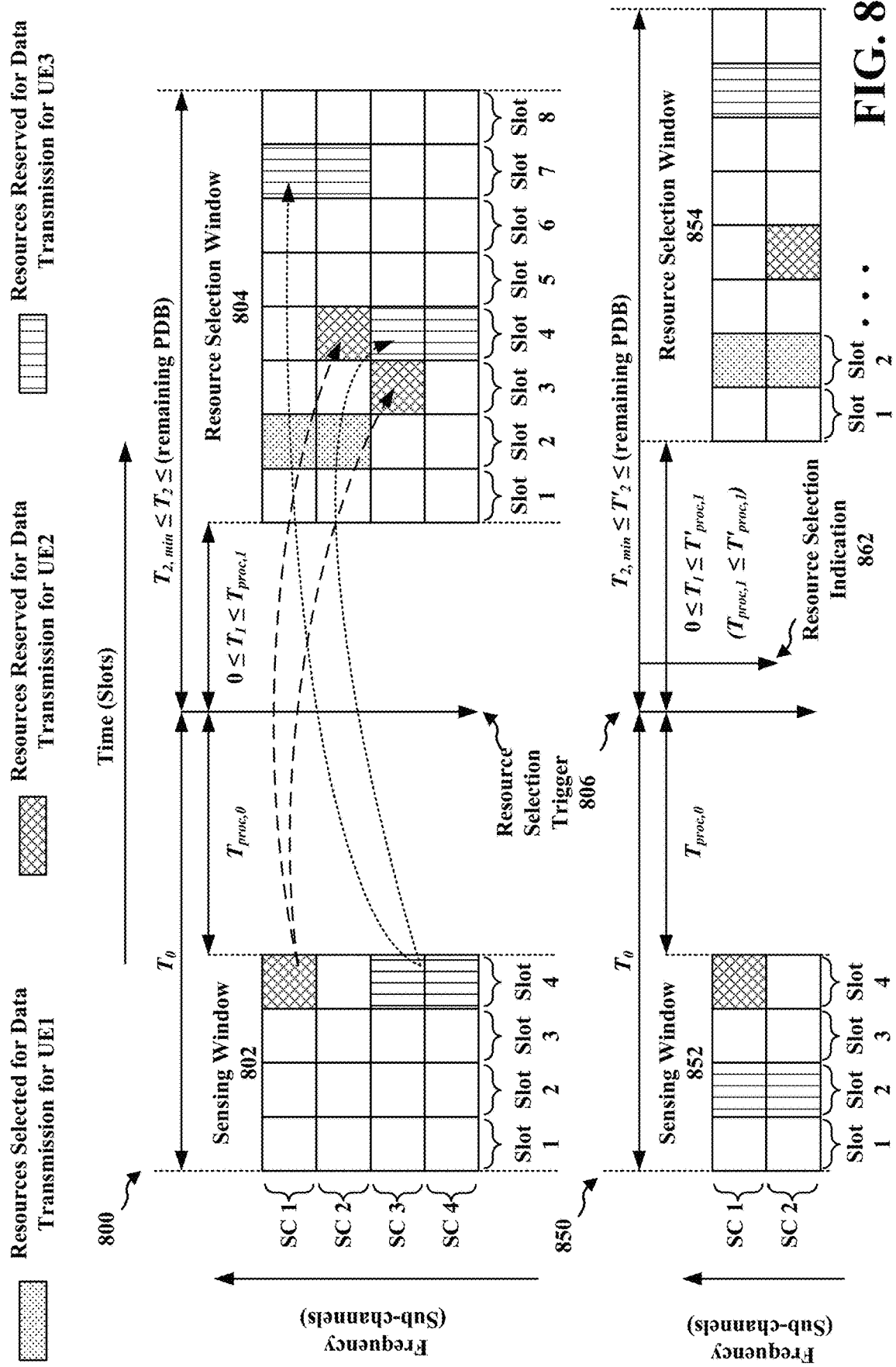
FIG. 8 is a set of diagrams illustrating example timelines for a sensing-based resource selection without selection reporting and with selection reporting.

FIG. 8 is a set of diagrams 800 and 850 illustrating example timelines for a sensing-based resource selection without selection reporting (e.g., 800) and with selection reporting (e.g. 850). For example, a first UE ("UE1") may sense and decode the SCI received from other UEs during a sensing window 802 (or 852), e.g., a time duration (To) prior to resource selection. To may be configured for the UE. Among other examples, To may have a value such as 100 ms or 1100 ms. In some aspects, the length of the sensing window may be configured for the UE. Based on the sensing history during the sensing window, the UE may be able to maintain a set of available candidate resources in a resource selection window 804 (or 854) by excluding resources that are reserved by other UEs, e.g., a second UE ("UE 2") and a third UE ("UE 3"), from the set of candidate resources. UE 1 may select resources from its set of available candidate resources during a selection processing interval ("$T_{proc,0}$") from the end of the sensing window 802 (or 852) to a resource selection trigger 806 (e.g., a time at which a resource is selected). As described above in relation to FIG. 7, maintaining the set of available resources may include an RSRP threshold for signals reserving resources in the resource selection window (e.g., SCI) below which associated reserved resources are considered to be available. If the UE determines that the available resources represent a fraction of the resources in the resource selection window that is below a configured threshold value (e.g., less than 10%, 25%, or 50% of the resources being available), a different threshold RSRP value may be applied until the available resources represent a fraction of the resources in the resource selection window that is above the configured threshold value.

The time $T_{proc,0}$ indicates a processing time for resource selection and may be determined by a processing capacity of UE 1. The sensing and selection interval between the beginning of the sensing window and the resource selection trigger may be the same whether or not UE 1 performs selection reporting (e.g., reports a resource selection to a base station). After the selection is performed UE 1 may transmit SCI reserving the selected resources for sidelink transmission (e.g., a PSSCH transmission) by the UE. Diagram 850 illustrates that UE 1 may also transmit a resource selection indication 862 to a base station. The resource selection indication 862 enables the base station to adjust the downlink transmission in response to potential self-interference at the UE based on the sidelink transmission. There may be a time gap ($T_1$) between the UE selecting the resources and the UE transmitting SCI reserving the resources and/or the resource selection indication 862. In some aspects, time $T_1$ may be based on $0 \leq T_1 \leq T_{proc,1}$.

Additionally, for a selection process with selection reporting, a time ("$T'_{proc,1}$") between the resource selection trigger 806 and the beginning of the resource selection window 854 may be different (e.g., larger) than a time ("$T_{proc,1}$") between the resource selection trigger 806 and the beginning of a resource selection window 804 for a selection process without selection reporting. For example, a UE may configure a maximum amount of time for an interval between a selection of resources (e.g., resource selection trigger 806) for a SL transmission and the beginning of a resource selection window (e.g., 854) to take the (larger) value $T_{proc,1}$ if the UE is configured to report the indication of the resources selected for the SL transmission. Alternatively, a UE may configure a maximum amount of time for an interval between a selection of resources (e.g., resource selection trigger 806) for a SL transmission and the beginning of a resource selection window (e.g., 804) to take the (smaller) value $T_{proc,1}$ if the UE is configured to not report the indication of the resources selected for the SL transmission.

Similarly, for a selection process with selection reporting, a time ("$T'_2$") between the resource selection trigger 806 and the end of the resource selection window 854 may be different (e.g., larger) than a time ("$T_2$") between the resource selection trigger 806 and the end of the resource selection window 804 for a selection process without selection reporting. For example, a UE may configure a time for an interval between the resource selection trigger 806 and the end of the resource selection window 854 to take the (larger) value $T'_2$ if the UE is configured to report the indication of the resources selected for the SL transmission. Alternatively, a UE may configure a time for an interval between the resource selection trigger 806 and the end of the resource selection window 854 to take the (smaller) value $T_2$ if the UE is configured to not report the indication of the resources selected for the SL transmission.

In some aspects, $T_{proc,1}$ and $T'_2$ are larger than $T_{proc,1}$ and $T_2$, respectively, in order to allow for UE 1 to report a resource selection and receive a response from a base station. ("$T_2$") may be based on $T_{2,min} \leq T_2 \leq$ time based on remaining PDB. $T_{2,min}$ may be configured or defined based on a priority level and a subcarrier spacing. As an example, based on $\{1, 5, 10, 20\} \cdot 2^\mu$, $\mu=0, 1, 2, 3$ for SCS 15, 30, 60, 120 kHz respectively. The UE may check, or confirm, resource availability at a time that is at least $T_3$ prior to sidelink transmission.

The response from the base station may indicate a priority of a scheduled DL transmission overlaps at least partially in time (e.g., is simultaneous) with the SL transmission via the selected resources. The priority of the DL transmission may indicate, e.g., based on a configured policy, one of (1) an adjustment to DL transmission/reception parameters (e.g., a modulation and coding scheme (MCS), a rank, a transmission power, etc.) associated with the indicated priority or (2) an indication to UE 1 that the SL transmission should not be transmitted via the selected resources.

Figure 9:
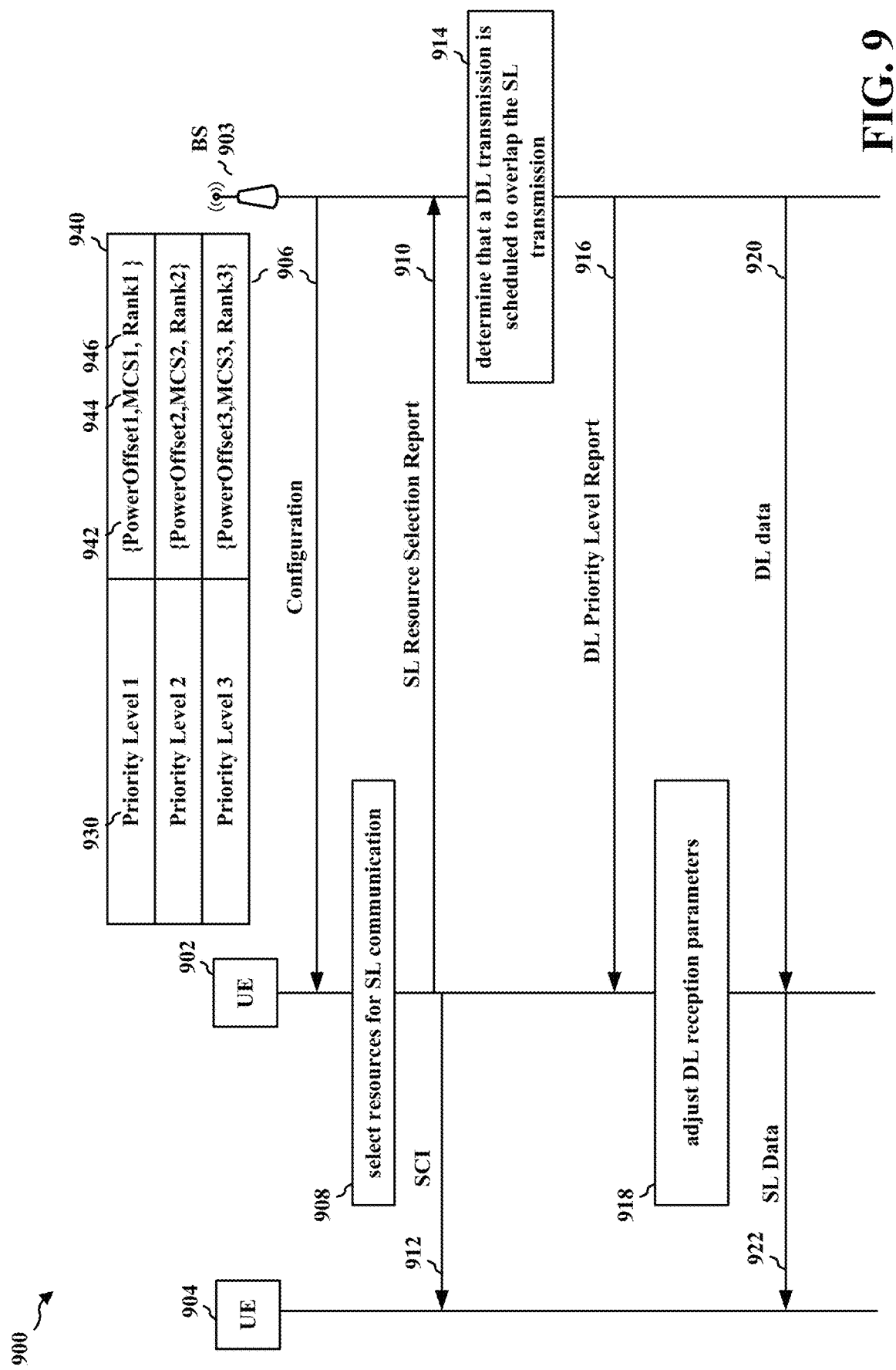
FIG. 9 is a call flow diagram illustrating a resource selection and reporting operation for sidelink communication.

FIG. 9 is a call flow diagram 900 illustrating a resource selection and reporting operation for sidelink communication. Diagram 900 illustrates a first UE 902, a base station 903, and a second UE 904. The UE 902 may be communicating with the base station 903, e.g., on an access link, and may also be communicating with UE 904 via sidelink communication. The UE 902 may autonomously determine resources to use for sidelink transmission (e.g., based on a Mode 2 sidelink resource allocation). In some aspects, the base station 903 may transmit, and the UE 902 may receive, a sidelink resource selection reporting configuration 906, which may indicate for the UE to report selected sidelink resources, e.g., that the UE may use in a full-duplex mode. In some aspects, the configuration 906 may include one or more of an indication of a configured period for a periodic reporting operation or an indication of a bitmap associated with resources in a resource selection window (e.g., resource selection window 854).

In some aspects, the configuration 906 may include power offset information for reception of a downlink transmission that overlaps with sidelink transmission at the UE. For example, the base station may transmit a DL transmission using a higher transmission power if the DL transmission overlaps with the resources selected by the UE for SL transmission. In some aspects, the base station may use different power offsets for different priorities of DL transmissions. In some aspects, the configuration 906 may include a set of reception parameters associated with one or more priorities of different DL and SL transmissions. Similar to a different transmission power, the base station may use a different MCS or a different rank for a DL transmission that overlaps with the SL transmission by the UE. The configuration 906 may indicate an MCS or a rank to the UE for a DL transmission that overlaps in time with the SL resources selected by the UE. For example, the reception parameters in the configuration 906 may include a transmission power (e.g., indicated via a power offset 942), an MCS 944, and/or a rank 946 associated with a priority level 930 of a DL transmission that overlaps in time with a SL transmission. Different reception parameters may be associated with different priorities of DL transmissions and/or with different relative priorities of DL and SL transmissions. For example, a DL transmission with a first priority level may be transmitted with a power level that is associated with a first offset, while a DL transmission with a second priority may be transmitted with a power level associated with a second offset. Similarly, different priorities of DL transmissions may be associated with different (e.g., reduced) MCS or rank. The different parameters may also be associated with different relative priorities of the SL and DL transmissions (e.g., PDCCH generally has a higher priority than PSSCH and the DL will be transmitted with one or more of greater power, MCS reduction, or rank reduction). The different parameters may be applied to mitigate self-interference from the SL transmission at the UE 902.

The UE 902 may perform a selection operation 908 to select resources for a SL communication as described above in relation to diagram 850 of FIG. 8. After selecting 908 the resources for the SL communication, the UE 902 may transmit, and the base station 903 may receive, a SL resource selection report 910. The SL resource selection report 910 may indicate the selected resources or a subcarrier (subchannel) associated with the selected resources. The UE may transmit the SL resource selection report 910 in UCI to the base station. The UE may transmit the SL resource selection report 910 to the base station in a MAC-CE. The UE may transmit the SL resource selection report 910 to the base station in UE assistance information, e.g., in an RRC message. The indication of the selected resources may be via a bitmap associated with the set of resources in a resource selection window (e.g., the resource selection window 854) or a bitmap associated with subcarriers in the resource selection window. In some aspects, the UE may transmit an indication of sidelink activity on a sub-channel rather than indicating specific resources in time and frequency that are selected for a sidelink transmission. For example, the indication of the SL resource selection, at 910, may be less granular than the reserved resources indicated in SCI, e.g., at 912. In some aspects, the UE may provide a periodic report that indicates one or more sub-channels on which the UE may transmit a sidelink transmission. The period for the report may be configured for the UE by the base station, e.g., in RRC signaling. The UE may additionally transmit an indication of the selected resources to the UE 904 via SCI 912, which may indicate to sidelink resource reservation to the receiving UE as well as to other UEs communicating based on sidelink.

The base station 903 may determine 914 that a DL transmission is scheduled to overlap the SL transmission in time. Based on the determination 914, the base station 903 may transmit, and the UE 902 may receive, a DL priority level report 916. The DL priority level report 916 may indicate a particular priority of the DL transmission.

The UE 902 may adjust 918 a DL reception based on the received DL priority level. The DL priority level may identify a set of parameters associated with the indicated DL priority level. In some aspects, the set of parameters may be identified based on the indicated priority level and on a priority level of the SL transmission known to the UE 902. The reception parameters may include a transmission power (e.g., indicated via a power offset), an MCS, and/or a rank associated with the indicated priority level of the DL transmission that overlaps in time with the SL transmission. The base station 903 may transmit, and the UE 902 may receive, DL data 920 based on the set of parameters identified based on the DL priority level report 916. The UE 902 may transmit, and the UE 904 may receive, the SL data 922 via the selected SL resources.

Figure 10:
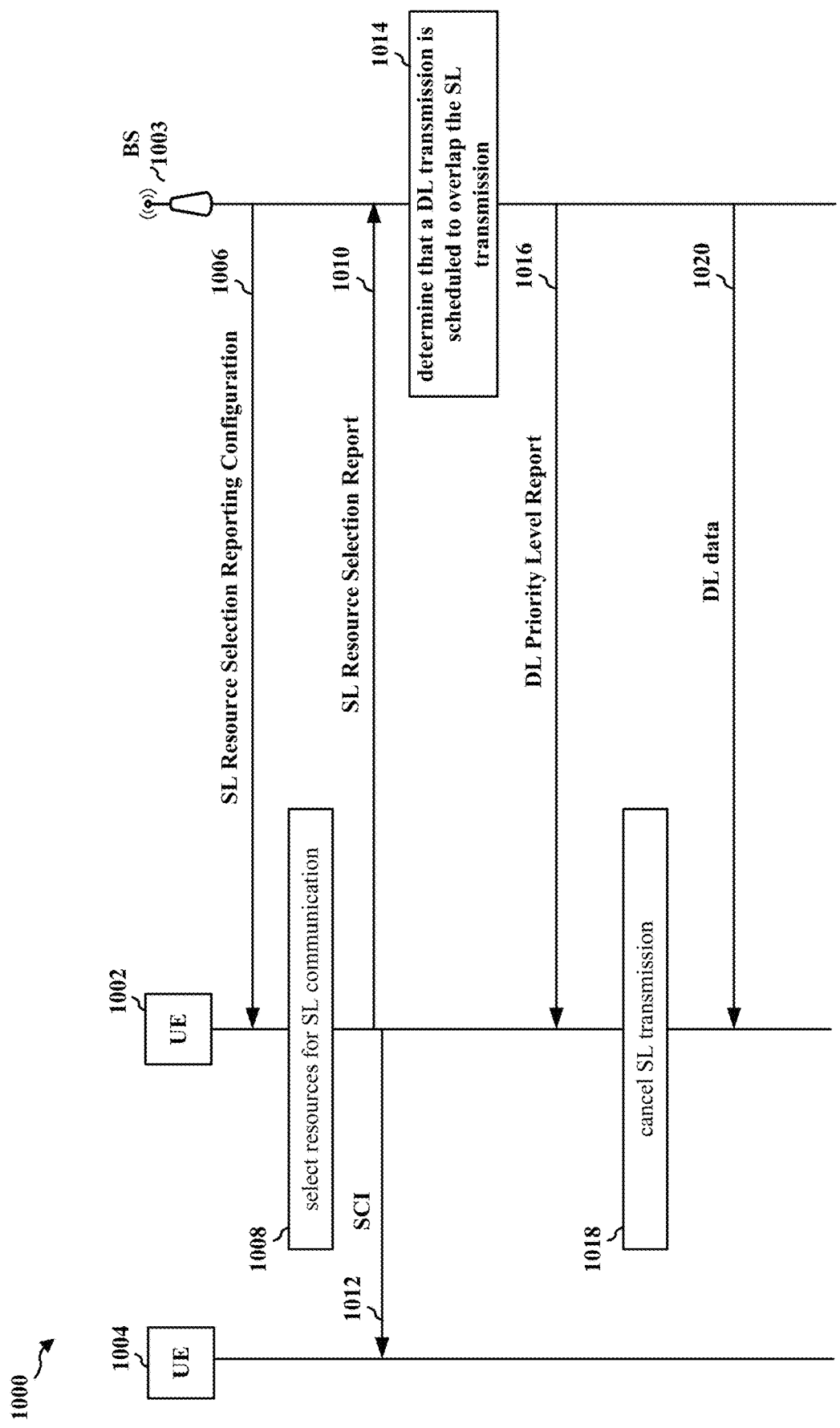
FIG. 10 is a call flow diagram illustrating a resource selection and reporting operation for sidelink communication.

FIG. 10 is a call flow diagram 1000 illustrating a resource selection and reporting operation for sidelink communication. Diagram 1000 illustrates a first UE 1002, a base station 1003, and a second UE 1004. The UE 1002 may be communicating with the base station 1003 and may also be communicating with UE 1004 via sidelink communication. The UE 1002 may autonomously determine resources to use for sidelink transmission (e.g., a Mode 2 determination). The base station 1003 may transmit, and the UE 1002 may receive, sidelink resource selection reporting configuration 1006. The configuration 1006 may include one or more of a set of reception parameters associated with priorities of different DL and SL transmissions, an indication of a configured period for a periodic reporting operation, an indication of a bitmap associated with resources in a resource selection window (e.g., resource selection window 854).

The reception parameters in the configuration 1006 may include a transmission power (e.g., indicated via a power offset), an MCS, and/or a rank associated with a priority level of a DL transmission that overlaps in time with a SL transmission. A policy at the base station 903 may define priority levels associated with different types of SL and DL transmissions (e.g., RRC (high), SCI/DCI (normal), PDSCH (low), PSSCH (low), PDCCH (high), PSCCH (high), etc.). Different reception parameters may be associated with different priorities of DL transmissions and/or with different relative priorities of DL and SL transmissions. For example, a DL transmission with a first priority level may be transmitted with a power level that is associated with a first offset, while a DL transmission with a second priority may be transmitted with a power level associated with a second offset. Similarly, different priorities of DL transmissions may be associated with different (e.g., reduced) MCS or rank. The different parameters may also be associated with different relative priorities of the SL and DL transmissions (e.g., PDCCH generally has a higher priority than PSSCH and the DL will be transmitted with one or more of greater power, MCS reduction, or rank reduction). The different parameters may be applied to mitigate self-interference from the SL transmission at the UE 1002.

The UE 1002 may perform a selection operation 1008 to select resources for a SL communication as described above in relation to diagram 850 of FIG. 8. After selecting 1008 the resources for the SL communication, the UE 1002 may transmit, and the base station 1003 may receive, a SL resource selection report 1010. The SL resource selection report 1010 may indicate the selected resources or a sub-carrier (subchannel) associated with the selected resources. The indication of the selected resources may be via a bitmap associated with the set of resources in a resource selection window (e.g., the resource selection window 854) or a bitmap associated with subcarriers in the resource selection window. The UE may additionally transmit an indication of the selected resources to the UE 1004 via SCI 1012.

The base station 1003 may determine 1014 that a DL transmission is scheduled to overlap the SL transmission in time. Based on the determination 1014, the base station 1003 may transmit, and the UE 1002 may receive, a DL priority level report 1016. The DL priority level report 1016 may indicate a particular priority of the DL transmission.

The UE 1002 may cancel 1018 the SL data transmission via the selected resources based on the received DL priority level. The DL priority level may indicate a set of parameters associated with the indicated DL priority level and may further indicate for the UE 902 to cancel the overlapping (in time) SL transmission. The base station 1003 may transmit, and the UE 1002 may receive, DL data 1020 based on the set of parameters identified based on the DL priority level report 1016. Alternatively, the base station may cancel the DL transmission based on an overlap with the resources selected by the UE for the SL transmission.

Figure 11:
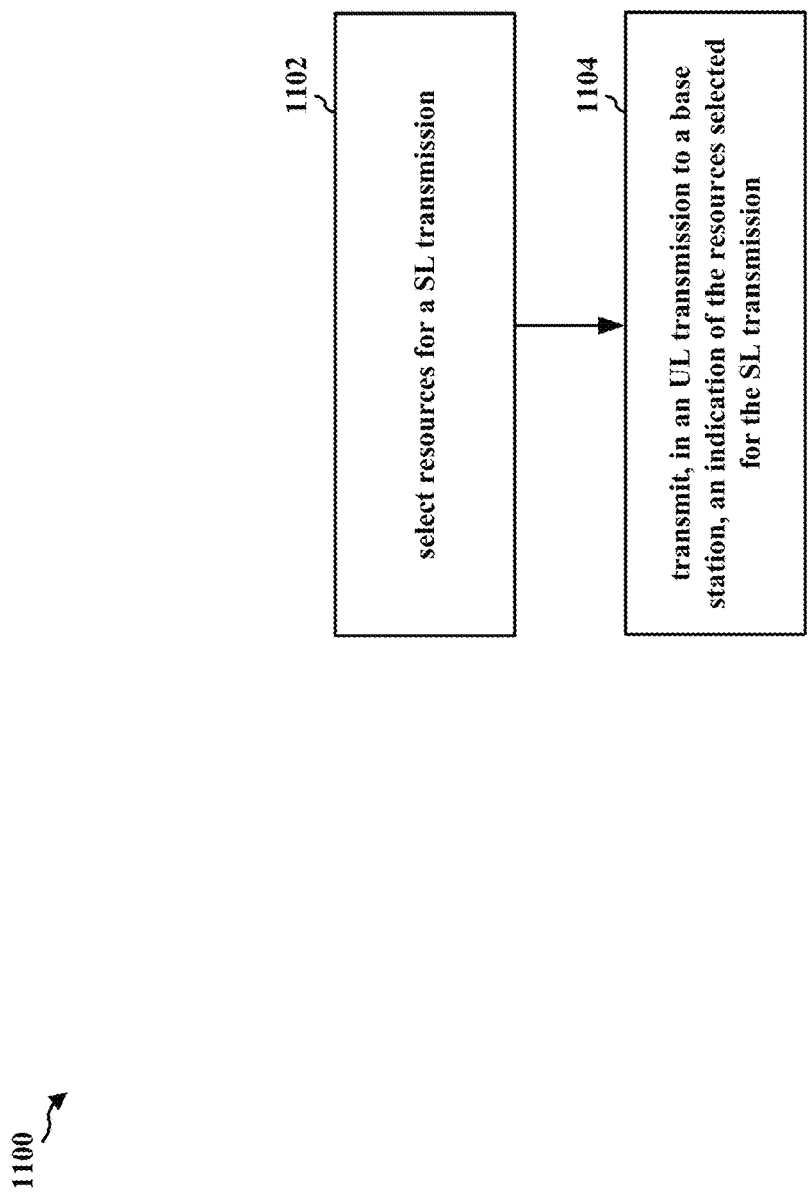
FIG. 11 is a flowchart of a method of wireless communication.

FIG. 11 is a flowchart 1100 of a method of wireless communication. The method may be performed by a sidelink-capable device (e.g., the UE 103/902/1002; the apparatus 1502). At 1102, the device may select resources for a sidelink transmission. The device may select the resources from a set of available resources. The available resources may be based on a sensing operation as described in relation to FIG. 8. For example, referring to FIGS. 8-10, the UE 902/1002 may select 908/1008 resources for SL communication from a resource selection window 854 based on a sensing operation during sensing window 852. For example, 1102 may be performed by SL resource selection component 1540.

At 1104, the device may transmit an indication of the resources selected for the SL transmission to a base station in an UL transmission. For example, referring to FIGS. 8-10, the UL transmission 910/1010 may be via one of uplink control information (UCI), media access control (MAC) control elements (CE) (MAC-CE), or UE assistance information. The indication of the selected resources 910/1010 may include an indication of specific resources in a resource selection window (e.g., resource selection window 854) via a bitmap with each bit corresponding to a particular resource. In some aspects, the indication of the selected resources 910/1010 may include an identifier of a subcarrier (or subchannel) associated with the selected resources. The indication may also be transmitted based on a configured periodicity of subcarrier, or selected, resources. The device may also transmit a selection indication (e.g., SL resource selection report 1010) based on a configuration 1006 from a base station. For example, for certain devices with a low DL-traffic density, a UE may be configured to not transmit the SL selection report unless a request has been received. For example, referring to FIGS. 9 and 10, the UE 902/1002 may transmit SL resource selection report 910/1010 to base station 903/1003 (e.g., based on a configuration 1006). For example, 1104 may be performed by SL resource selection reporting component 1544.

Figure 12:
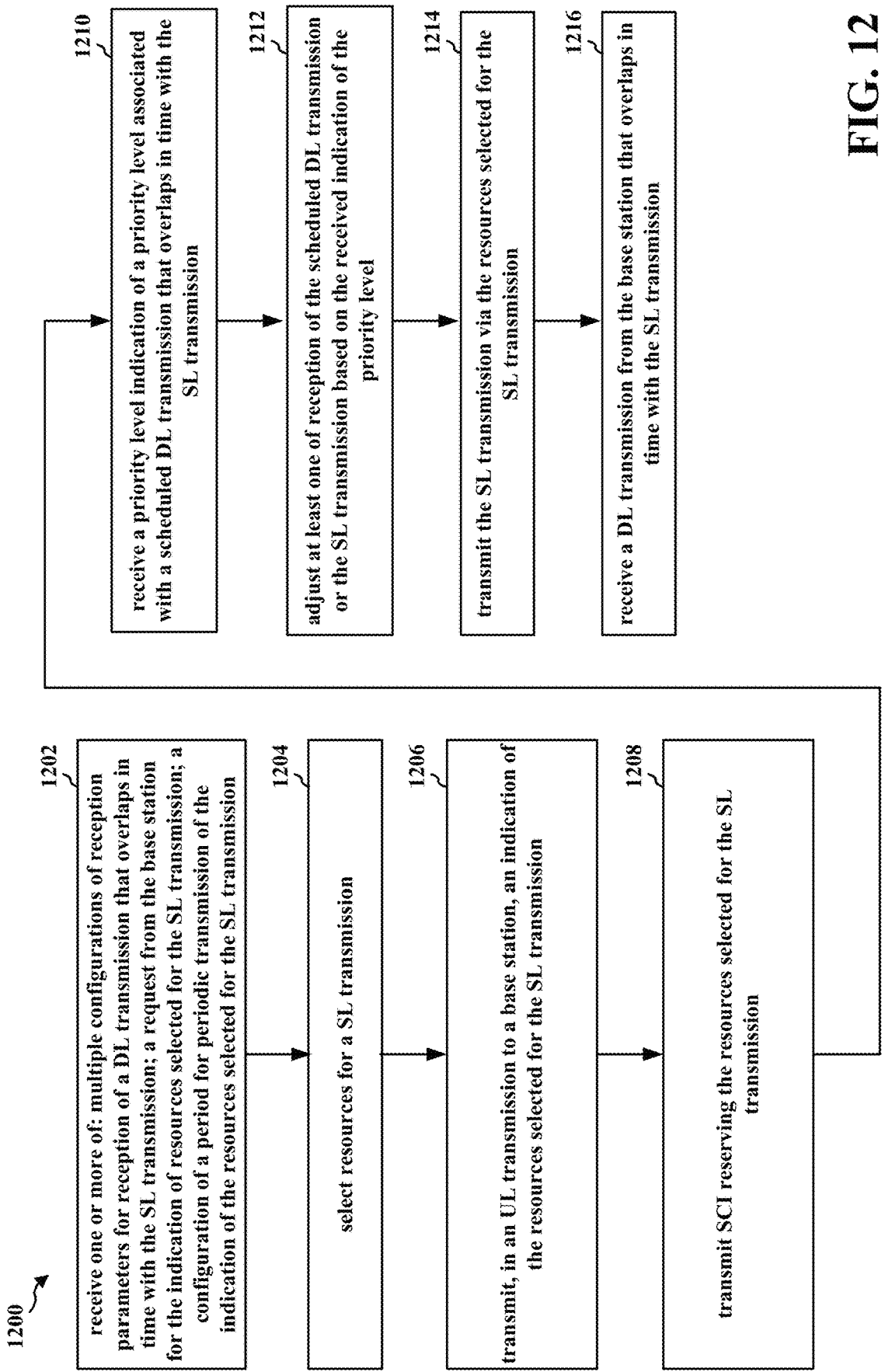
FIG. 12 is a flowchart of a method of wireless communication.

FIG. 12 is a flowchart 1200 of a method of wireless communication. The method may be performed by a sidelink-capable device (e.g., the UE 103/902/1002; the apparatus 1502). At 1202, the device may receive one or more of multiple configurations of reception parameters (e.g., PowerOffset 942, MCS 944, and/or Rank 946) for reception of a DL transmission that overlaps in time with the SL transmission, a request (e.g., in configuration 1006) from the base station for the indication of resources selected for the SL transmission, or an indication (e.g., in configuration 1006) of a period for periodic transmission of the indication of the resources selected for the SL transmission. For example, referring to FIGS. 9 and 10, the UE 902 may receive a configuration 906 that includes sets of DL transmission parameters 940 associated with a priority level 930 and UE 1002 may receive SL resource selection reporting configuration 1006 indicating a request from the base station for the indication of resources selected for the SL transmission, or an indication of a period for periodic transmission of the indication of the resources selected for the SL transmission. For example, 1202 may be performed by SL configuration component 1542.

At 1204, the device may select resources for a sidelink transmission. The device may select the resources from a set of available resources. The available resources may be based on a sensing operation as described in relation to FIG. 8. For example, referring to FIGS. 9 and 10, the UE 902/1002 may select 908/1008 resources for SL communication. For example, 1204 may be performed by SL resource selection component 1540.

At 1206, the device may transmit an indication of the resources selected for the SL transmission to a base station in an UL transmission. The UL transmission may be via one of UCI, a MAC-CE, or UE assistance information. The indication of the selected resources may include an indication of specific resources in a resource selection window (e.g., resource selection window 854) via a bitmap with each bit corresponding to a particular resource. In some aspects, the indication of the selected resources may include an identifier of a subcarrier (or subchannel) associated with the selected resources. The indication may also be made based on a configured periodicity of subcarrier or selected resources. The device may also transmit a selection indication based on a request from a base station. For example, for certain devices with a low DL-traffic density, a UE may be configured to not transmit the SL selection report unless a request has been received. For example, referring to FIGS. 9 and 10, the UE 902/1002 may transmit SL resource selection report 910/1010 to base station 903/1003. For example, 1206 may be performed by SL resource selection reporting component 1544.

At 1208, the device may transmit SCI reserving the resources selected, at 1204, for the SL transmission. For example, referring to FIGS. 9 and 10, the UE 902/1002 may transmit SCI 912/1012 to UE 904/1004. For example, 1208 may be performed SL resource selection reporting component 1544.

At 1210, the device may receive a priority level indication of a priority level associated with a scheduled DL transmission that overlaps in time with the SL transmission. For example, referring to FIGS. 9 and 10, the UE 902/1002 may receive, a DL priority level report 916/1016. For example, 1210 may be performed by SL communication component 1546.

At 1212, the device may adjust at least one of reception of the scheduled DL transmission or the SL transmission based on the received indication of the priority level. The DL priority level 930 may identify a set of parameters 940 associated with the indicated DL priority level. In some aspects, the set of parameters may be identified based on the indicated priority level and on a priority level of the SL transmission known to the device. The reception parameters may include a transmission power (e.g., indicated via a power offset 942), an MCS (e.g. 944), and/or a rank (e.g., 946) associated with the indicated priority level of the DL transmission that overlaps in time with the SL transmission. In some aspects, the device may cancel 1018 the SL data transmission via the selected resources based on the received DL priority level. The DL priority level may indicate a set of parameters associated with the indicated DL priority level and may further indicate for the device to cancel the overlapping (in time) SL transmission. For example, referring to FIGS. 9 and 10, the UE 902/1002 may adjust 918 DL reception parameters or may cancel 1018 the SL transmission. For example, 1212 may be performed by SL communication component 1546.

At 1214, the device may transmit the SL transmission via the resources selected for the SL transmission. For example, referring to FIG. 9, the UE 902 may transmit SL data 922. For example, 1214 may be performed by SL communication component 1546.

At 1216, the device may receive a DL transmission from the base station that overlaps in time with the SL transmission. The reception parameters of the DL transmission at 1216 may be based on the priority level indication received at 1210. The set of parameters may be identified based on the indicated priority level and on a priority level of the SL transmission known to the device. The reception parameters may include a transmission power (e.g., indicated via a power offset), an MCS, and/or a rank associated with the indicated priority level of the DL transmission that overlaps in time with the SL transmission. For example, referring to FIGS. 9 and 10, the UE 902/1002 may receive DL data 920/1020 based on DL priority level report 916/1016. For example, 1216 may be performed by SL communication component 1546.

Figure 13:
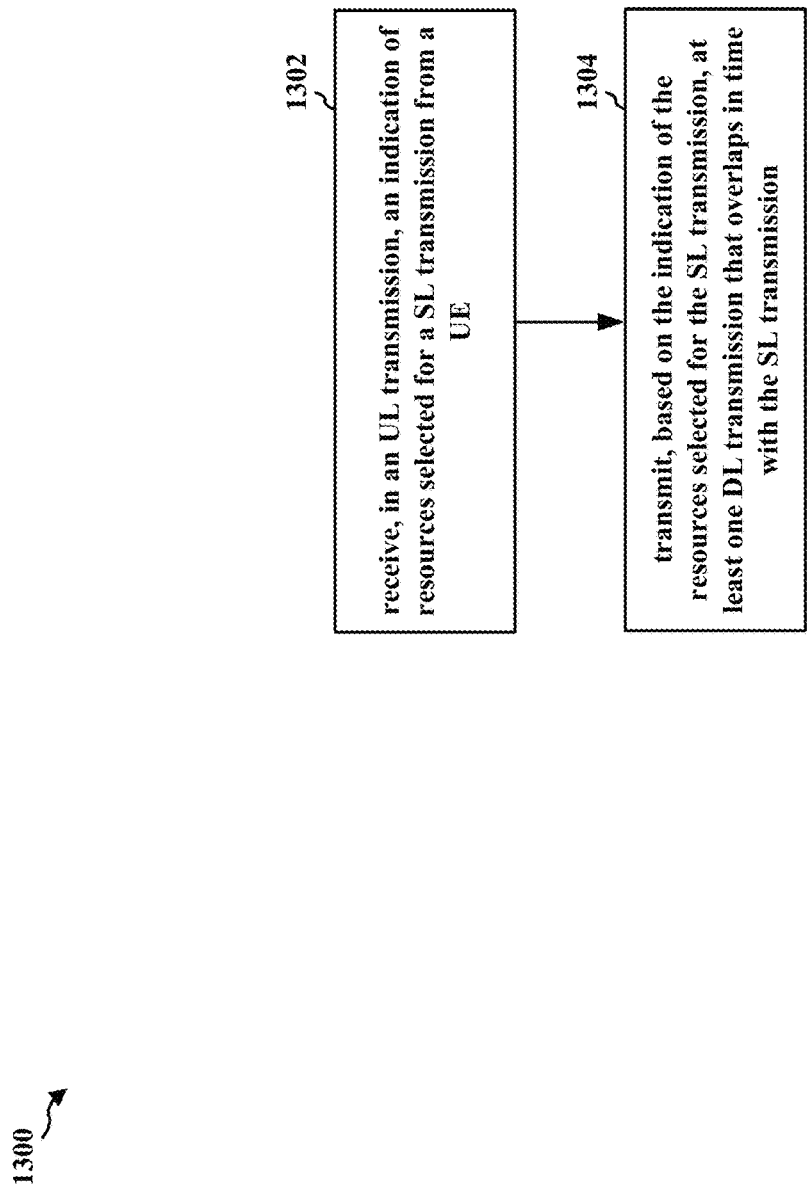
FIG. 13 is a flowchart of a method of wireless communication

FIG. 13 is a flowchart 1300 of a method of wireless communication. The method may be performed by a base station (e.g., the base station 102/180/903/1003; the apparatus 1602). At 1302, the device may receive an indication of the resources selected for the SL transmission from a UE in an UL transmission. The UL transmission may be via one of UCI, a MAC-CE, or UE assistance information. The indication of the selected resources may include an indication of specific resources in a resource selection window (e.g., resource selection window 854) via a bitmap with each bit corresponding to a particular resource. In some aspects, the indication of the selected resources may include an identifier of a subcarrier (or subchannel) associated with the selected resources. The indication may also be made based on a configured periodicity of subcarrier or selected resources. The base station may also receive a selection indication based on a request from the base station. For example, for certain devices with a low DL-traffic density, a UE may be configured to not transmit the SL selection report to the base station unless a request has been received. For example, referring to FIGS. 9 and 10, the base station 903/1003 may receive SL resource selection report 910/1010 from UE 902/1002. For example, 1302 may be performed by DL priority indication component 1642.

At 1304, the device may transmit, based on the indication of the resources selected for the SL transmission received at 1302, at least one DL transmission that overlaps in time with the SL transmission. The DL transmission at 1304 may be transmitted based on reception parameters that may include a transmission power (e.g., indicated via a power offset), an MCS, and/or a rank associated with the indicated priority level of the DL transmission. For example, referring to FIGS. 9 and 10, the base station 903/1003 may transmit DL data 920/1020 to UE 902/1002. For example, 1304 may be performed by DL transmission component 1644.

Figure 14:
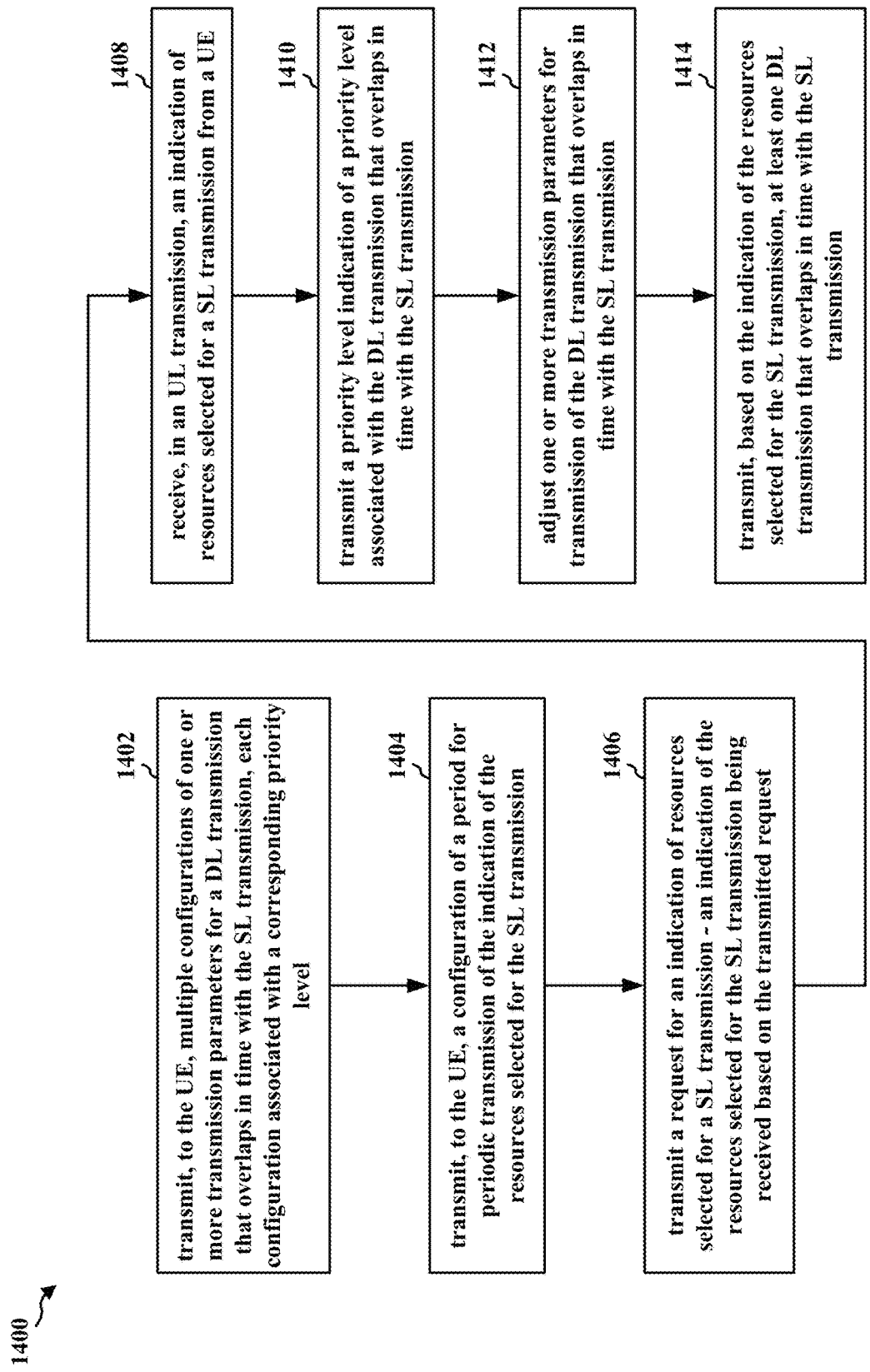
FIG. 14 is a flowchart of a method of wireless communication

FIG. 14 is a flowchart 1400 of a method of wireless communication. The method may be performed by a base station (e.g., the base station 102/180/903/1003; the apparatus 1602). At 1402, the base station may transmit, to the UE, multiple configurations of one or more transmission parameters for a DL transmission that overlaps in time with the SL transmission, each configuration associated with a corresponding priority level. The transmission parameters in a configuration of one or more transmission parameters may include a transmission power (e.g., indicated via a power offset), an MCS, and/or a rank transmit with an indicated priority level of the DL transmission that overlaps in time with the SL transmission. For example, referring to FIGS. 9 and 10, base station 903/1003 may transmit SL resource selection reporting configuration 906 that includes sets of DL transmission parameters 940 associated with a priority level 930. For example, 1402 may be performed by SL configuration component 1640.

At 1404, the device may transmit, to the UE, an indication of a period for periodic transmission of the indication of the resources selected for the SL transmission. The periodic indication transmission may identify whether or not there is activity on each of a set of sub-channels (or subcarriers). For example, a bitmap may be used to identify the sub-channels with activity. For example, referring to FIGS. 9 and 10, base station 903/1003 may transmit SL resource selection reporting configuration 906 that includes the period for periodic transmission of the indication of the resources selected for the SL transmission. For example, 1402 may be performed by SL configuration component 1640.

At 1406, the device may transmit a request for an indication of resources selected for a SL transmission, where the indication of the resources selected for the SL transmission is received based on the transmitted request. For example, referring to FIGS. 9 and 10, base station 903/1003 may transmit SL resource selection reporting configuration 906 that includes a request for an indication of (or report regarding) resources selected for a SL transmission the period for periodic transmission of the indication of the resources selected for the SL transmission. For example, 1402 may be performed by SL configuration component 1640.

At 1408, the base station may receive an indication of the resources selected for the SL transmission from the device (e.g., UE) in an UL transmission. The UL transmission may be via one of UCI, a MAC-CE, or UE assistance information. The indication of the selected resources may include an indication of specific resources in a resource selection window (e.g., resource selection window 854) via a bitmap with each bit corresponding to a particular resource. In some aspects, the indication of the selected resources may include an identifier of a subcarrier (or subchannel) associated with the selected resources. The indication may also be received based on a configured periodicity of subcarrier or selected resources. The device may also transmit a selection indication based on a request from a base station. For example, referring to FIGS. 9 and 10, the base station 903/1003 may receive SL resource selection report 910/1010 from UE 923/1002. For example, 1408 may be performed by DL priority indication component 1642.

At 1410, the base station may transmit a priority level indication of a priority level associated with a scheduled DL transmission that overlaps in time with the SL transmission. For example, referring to FIGS. 9 and 10, the base station 903/1003 may transmit a DL priority level report 916/1016. For example, 1410 may be performed by DL priority indication component 1642.

At 1412, the device may adjust one or more transmission parameters for transmission of the DL transmission that overlaps in time with the SL transmission. The DL priority level may identify a set of parameters associated with the indicated DL priority level. In some aspects, the set of parameters may be identified based on the indicated priority level. The reception parameters may include a transmission power (e.g., indicated via a power offset), an MCS, and/or a rank associated with the indicated priority level of the DL transmission that overlaps in time with the SL transmission. The DL priority level may indicate a set of parameters associated with the indicated DL priority level and may further indicate for the device to cancel the overlapping (in time) SL transmission. For example, referring to FIGS. 9 and 10, the base station 903/1003 may adjust 918 DL reception parameters or may cancel 1018 the SL transmission. For example, 1412 may be performed DL transmission component 1644.

At 1414, the device may transmit, based on the indication of the resources selected for the SL transmission, at least one DL transmission that overlaps in time with the SL transmission. For example, referring to FIG. 9, the UE 902 may transmit SL data 922. For example, 1414 may be performed by SL communication component 1644.

Figure 15:
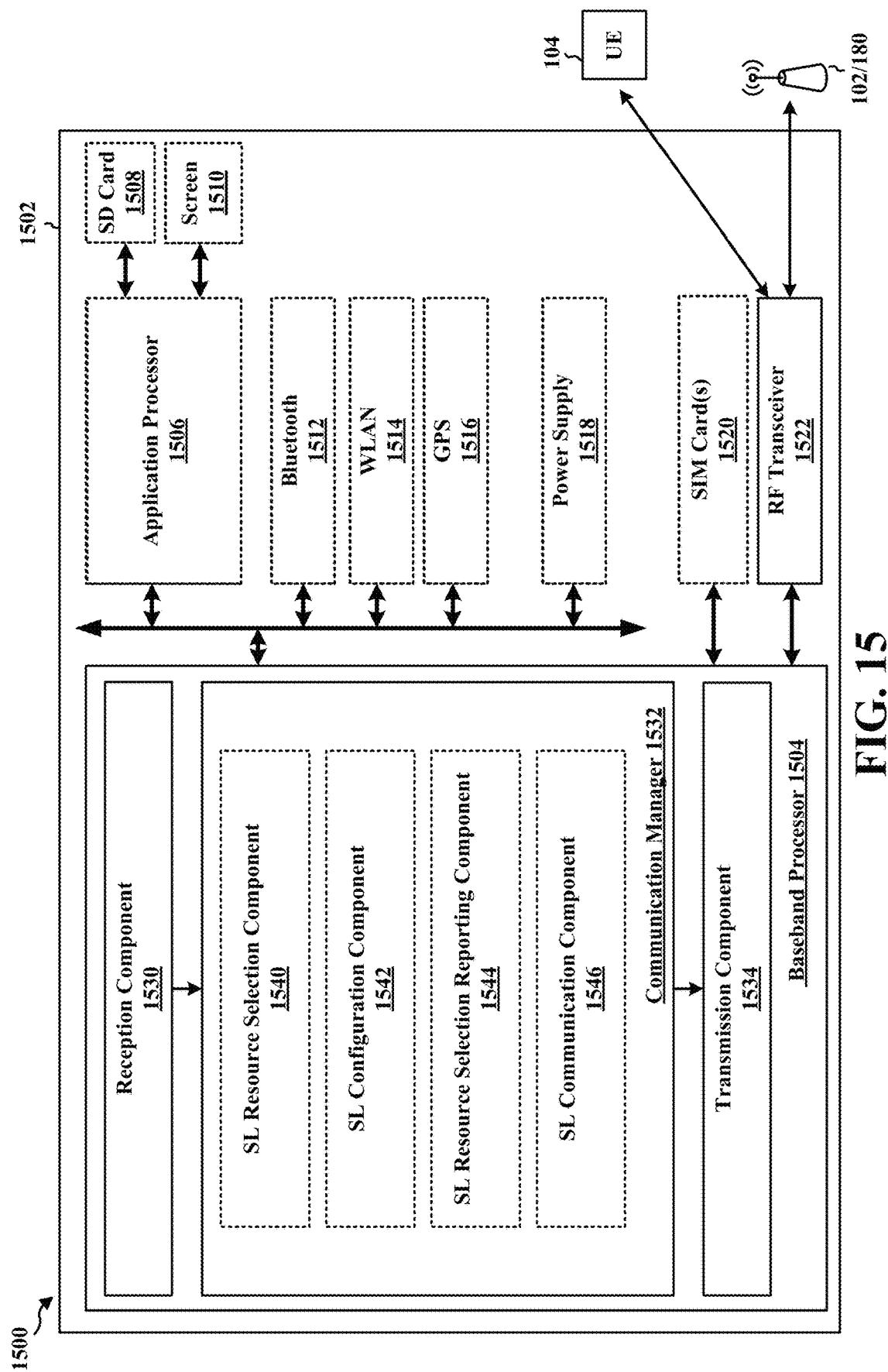
FIG. 15 is a diagram illustrating an example of a hardware implementation for an example apparatus.

FIG. 15 is a diagram 1500 illustrating an example of a hardware implementation for an apparatus 1502. The apparatus 1502 may be a UE, or another device configured to transmit and/or receive sidelink communication. The apparatus 1502 includes a baseband processor 1504 (also referred to as a modem) coupled to a RF transceiver 1522. In some aspects, the baseband processor 1504 may be a cellular baseband processor and/or the RF transceiver 1522 may be a cellular RF transceiver. The apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and/or a power supply 1518. The baseband processor 1504 communicates through the RF transceiver 1522 with the UE 104 and/or BS 102/180. The baseband processor 1504 may include a computer-readable medium/memory. The computer-readable medium/memory may be non-transitory. The baseband processor 1504 is responsible for general processing, including the execution of software stored on the computer-readable medium/memory. The software, when executed by the baseband processor 1504, causes the baseband processor 1504 to perform the various functions described in the present application. The computer-readable medium/memory may also be used for storing data that is manipulated by the baseband processor 1504 when executing software. The baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband processor 1504. The baseband processor 1504 may be a component of the device 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The communication manager 1532 includes a SL resource selection component 1540 that is configured to select resources for a sidelink transmission, e.g., as described in connection with 1102 and 1204 of FIGS. 11 and 12. The communication manager 1532 further includes a SL configuration component 1542 that is configured to receive one or more of multiple configurations of reception parameters for reception of a DL transmission that overlaps in time with the SL transmission, a request from the base station for the indication of resources selected for the SL transmission, or a configuration of a period for periodic transmission of the indication of the resources selected for the SL transmission, e.g., as described in connection with 1202 of FIG. 12. The communication manager 1532 further includes a SL resource selection reporting component 1544 that receives input in the form of an indication of resources selected for a SL communication from the SL resource selection component 1540 and a SL resource selection reporting configuration from the SL configuration component 1542 and is configured to transmit an indication of the resources selected for the SL transmission to a base station in an UL transmission and to transmit SCI reserving the resources selected for the SL transmission, e.g., as described in connection with 1104, 1206, and 1208 of FIGS. 11 and 12. The communication manager 1532 further includes a SL communication component 1546 that receives input in the form of an indication of resources selected for a SL communication from the SL resource selection component 1540 and is configured to receive a priority level indication of a priority level associated with a scheduled DL transmission that overlaps in time with the SL transmission, adjust at least one of reception of the scheduled DL transmission or the SL transmission based on the received indication of the priority level, transmit the SL transmission via the resources selected for the SL transmission and receive a DL transmission from the base station that overlaps in time with the SL transmission, e.g., as described in connection with 1210-1216 of FIG. 12.

The apparatus may include additional components that perform each of the blocks of the algorithm in the flowcharts of FIGS. 11 and 12. As such, each block in the flowcharts of FIGS. 11 and 12 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

In one configuration, the apparatus 1502, and in particular the baseband processor 1504, includes means for selecting resources for a SL transmission. The apparatus 1502, and in particular the baseband processor 1504, may also include means for transmitting, in an UL transmission to a base station, an indication of the resources selected for the SL transmission. The apparatus 1502, and in particular the baseband processor 1504, may also include means for transmitting SCI reserving the resources selected for the SL transmission. The apparatus 1502, and in particular the baseband processor 1504, may also include means for transmitting the SL transmission on the resources selected for the SL transmission. The apparatus 1502, and in particular the baseband processor 1504, may also include means for receiving a DL transmission from the base station that overlaps in time with the SL transmission. The apparatus 1502, and in particular the baseband processor 1504, may also include means for receiving, from the base station, a configuration of a period for periodic transmission of the indication of the resources selected for the SL transmission. The apparatus 1502, and in particular the baseband processor 1504, may also include means for adjusting one or more reception parameters for reception of a DL transmission that overlaps in time with the SL transmission. The apparatus 1502, and in particular the baseband processor 1504, may also include means for receiving an RRC configuration of the one or more reception parameters for DL reception that overlaps with the SL transmission. The apparatus 1502, and in particular the baseband processor 1504, may also include means for receiving multiple configurations of the one or more reception parameters for reception of a DL transmission that overlaps in time with the SL transmission, each configuration associated with a corresponding priority level. The apparatus 1502, and in particular the baseband processor 1504, may also include means for receiving a priority level indication of a priority level associated with a scheduled DL transmission that overlaps in time with the SL transmission. The apparatus 1502, and in particular the baseband processor 1504, may also include means for adjusting at least one of reception of the scheduled DL transmission or the SL transmission based on the received indication of the priority level. The apparatus 1502, and in particular the baseband processor 1504, may also include means for configuring a first time-interval parameter associated with a SL resource selection if the UE is configured to report the indication of the resources selected for the SL transmission. The apparatus 1502, and in particular the baseband processor 1504, may also include means for configuring a second, shorter time-interval parameter associated with a SL resource selection if the UE is not configured to report the indication of the resource selected for the SL transmission. The means may be one or more of the components of the apparatus 1502 configured to perform the functions recited by the means. As described herein, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 16:
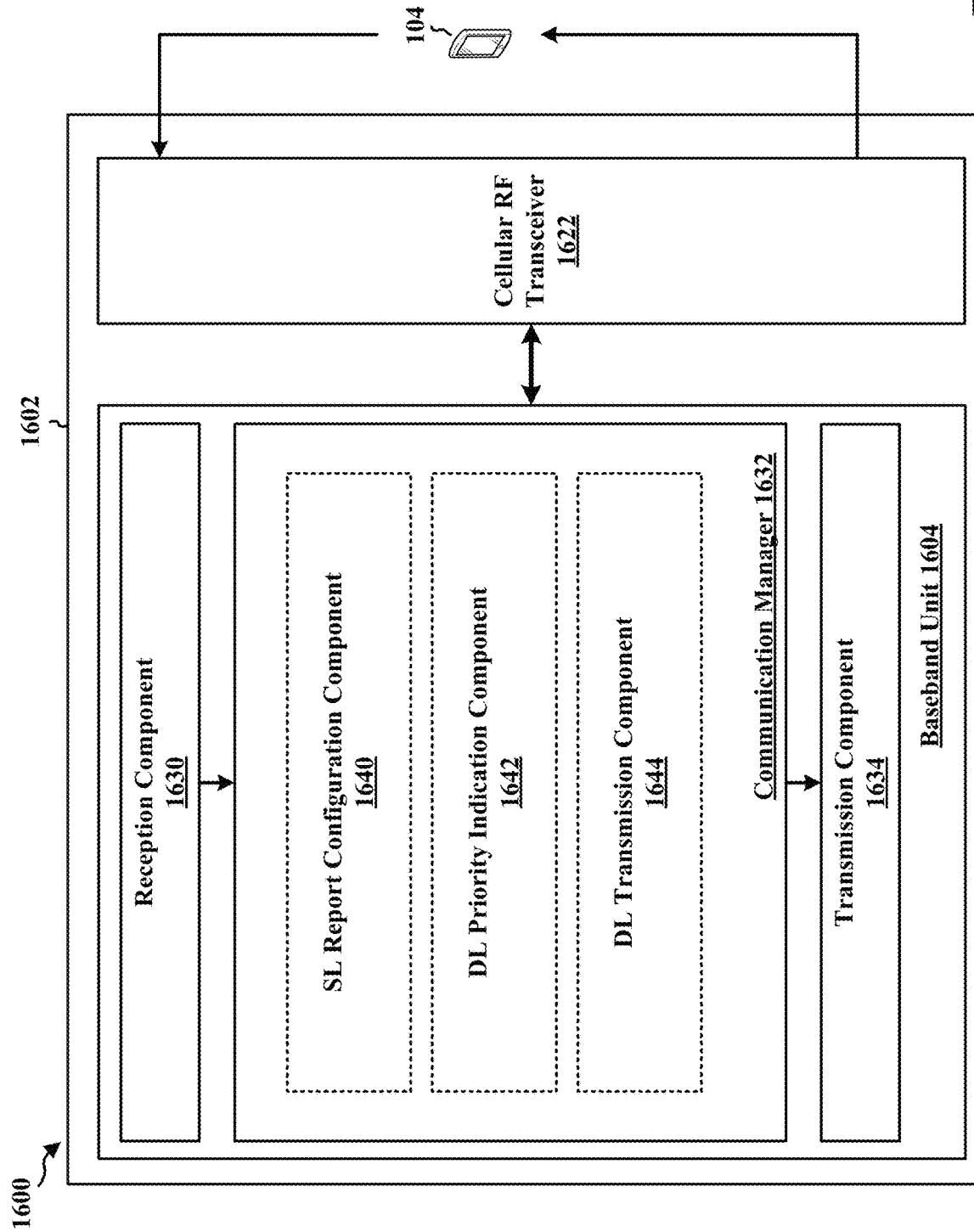
FIG. 16 is a diagram illustrating an example of a hardware implementation for an example apparatus.

FIG. 16 is a diagram 1600 illustrating an example of a hardware implementation for an apparatus 1602. The apparatus 1602 may be a base station, a component of a base station, or may implement base station functionality. In some aspects, the apparatus 1302 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes a SL Report configuration component 1640 that may be configured to transmit, to the UE, multiple configurations of one or more transmission parameters for a DL transmission that overlaps in time with the SL transmission, each configuration associated with a corresponding priority level; transmit, to the UE, a configuration of a period for periodic transmission of the indication of the resources selected for the SL transmission; and transmit a request for an indication of resources selected for a SL transmission, where the indication of the resources selected for the SL transmission is received based on the transmitted request, e.g., as described in connection with 1402-1406 of FIG. 14. The communication manager 1632 further includes a DL priority indication component 1642 that may be configured to receive an indication of the resources selected for the SL transmission from a UE in an UL transmission and to transmit a priority level indication of a priority level associated with a scheduled DL transmission that overlaps in time with the SL transmission, e.g., as described in connection with 1302, 1408, and 1410 of FIGS. 13 and 14. The communication manager 1632 further includes a DL transmission component 1644 that may be configured to adjust one or more transmission parameters for transmission of the DL transmission that overlaps in time with the SL transmission and to transmit, based on the indication of the resources selected for the SL transmission, at least one DL transmission that overlaps in time with the SL transmission, e.g., as described in connection with 1412 and 1414 of FIG. 14.

The apparatus may include additional components that perform each of the blocks of the algorithm in the flowcharts of FIGS. 13 and 14. As such, each block in the flowcharts of FIGS. 13 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for receiving, in an UL transmission, an indication of resources selected for a SL transmission from a UE. The apparatus 1602, and in particular the baseband unit 1604, may further include means for transmitting, based on the indication of the resources selected for the SL transmission, at least one DL transmission that overlaps in time with the SL transmission. The apparatus 1602, and in particular the baseband unit 1604, may further include means for transmitting, to the UE, a configuration of a period for periodic transmission of the indication of the resources selected for the SL transmission. The apparatus 1602, and in particular the baseband unit 1604, may further include means for adjusting one or more transmission parameters for transmission of the DL transmission that overlaps in time with the SL transmission. The apparatus 1602, and in particular the baseband unit 1604, may further include means for transmitting, to the UE, multiple configurations of one or more transmission parameters for a DL transmission that overlaps in time with the SL transmission, each configuration associated with a corresponding priority level. The apparatus 1602, and in particular the baseband unit 1604, may further include means for transmitting a priority level indication of a priority level associated with the DL transmission that overlaps in time with the SL transmission. The apparatus 1602, and in particular the baseband unit 1604, may further include means for. The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

In some aspects of wireless communication UEs may autonomously (e.g., not directed by a base station) select resources for SL transmissions. A UE may additionally communicate in a full-duplex (FD) mode in which the UE may transmit SL communication via a SL channel to a second UE while receiving downlink (DL) communication via a DL channel from a base station. A FD mode may be one of an in-band FD (IBFD) mode and a sub-band FDD. For example, in-band full duplex (IBFD) operation may include the transmission and reception of signals at overlapping times and overlapping in frequency. In sub-band FDD, transmission and reception resources may overlap in time using different frequencies, e.g., separated by a guard band. The transmission and reception frequency resources may be close enough that interference cancellation methods are used to cancel interference from the transmitted signal.

A transmission of SL communication via autonomously selected SL resources may cause self-interference for the transmitting UE, where the self-interference may lead to reception degradation for a simultaneous (e.g., overlapping at least partially in time) DL transmission. Aspects presented herein provide for informing a base station of autonomously selected SL resources, which may allow the base station to adjust the DL transmission to mitigate the reception degradation of the DL transmission due to self-interference from the SL transmission.

In an aspect of the disclosure, a method, a computer-readable medium, and an apparatus are provided. The apparatus may be a device at a UE. The device may be a processor and/or modem at a UE or the UE itself. The UE may be configured to select resources for a SL transmission and to transmit, in an UL transmission to a base station, an indication of the resources selected for the SL transmission. The UE may further be configured to transmit the SL transmission on the resources selected for the SL transmission and to receive a DL transmission from the base station that overlaps in time with the SL transmission. The UE may also be configured to receive multiple configurations of the one or more reception parameters for reception of a DL transmission that overlaps in time with the SL transmission, each configuration associated with a corresponding priority level; to receive a priority level indication of a priority level associated with a scheduled DL transmission that overlaps in time with the SL transmission; and to adjust at least one of reception of the scheduled DL transmission or the SL transmission based on the received indication of the priority level.

In an aspect of the disclosure, a method, a computer-readable medium, and an apparatus are provided. The apparatus may be a device at a base station. The device may be a processor and/or modem at a base station or the base station itself. The base station may be configured to receive, in an UL transmission, an indication of resources selected for a SL transmission from a UE, and to transmit, based on the indication of the resources selected for the SL transmission, at least one DL transmission that overlaps in time with the SL transmission. The base station may also be configured to transmit, to the UE, multiple configurations of one or more transmission parameters for a DL transmission that overlaps in time with the SL transmission, each configuration associated with a corresponding priority level; and to transmit a priority level indication of a priority level associated with the DL transmission that overlaps in time with the SL transmission.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to select resources for a SL transmission and transmit, in an UL transmission to a base station, an indication of the resources selected for the SL transmission.

Aspect 2 is the apparatus of aspect 1, where the at least one processor is further configured to transmit SCI reserving the resources selected for the SL transmission.

Aspect 3 is the apparatus of any of aspects 1 or 2, where the at least one processor is further configured to transmit the SL transmission on the resources selected for the SL transmission and receive a DL transmission from the base station that overlaps in time with the SL transmission.

Aspect 4 is the apparatus of any of aspects 1 to 3, where the indication of the resources selected for the SL transmission includes an indication of a set of subchannels including the resources selected for the SL transmission.

Aspect 5 is the apparatus of any of aspects 1 to 3, where the at least one processor is further configured to receive, from the base station, an indication of a period for periodic transmission of the indication of the resources selected for the SL transmission.

Aspect 6 is the apparatus of any of aspects 1 to 5, where the at least one processor is further configured to receive a request from the base station for the indication of resources selected for the SL transmission, where the indication of the resources selected for the SL transmission is transmitted based on the received request.

Aspect 7 is the apparatus of any of aspects 1 to 6, where the at least one processor is further configured to adjust one or more reception parameters for reception of a DL transmission that overlaps in time with the SL transmission.

Aspect 8 is the apparatus of aspect 7, where the one or more reception parameters includes an increased transmission power, a reduced MCS, or a reduced rank.

Aspect 9 is the apparatus of any of aspects 7 or 8, where the at least one processor is further configured to receive a configuration of the one or more reception parameters for DL reception that overlaps with the SL transmission.

Aspect 10 is the apparatus of any of aspects 7 to 9, where the at least one processor is further configured to receive multiple configurations of the one or more reception parameters for reception of a DL transmission that overlaps in time with the SL transmission, each configuration associated with a corresponding priority level; receive a priority level indication of a priority level associated with a scheduled DL transmission that overlaps in time with the SL transmission; and adjust at least one of reception of the scheduled DL transmission or the SL transmission based on the received indication of the priority level.

Aspect 11 is the apparatus of aspect 10, where the UE receives the scheduled DL transmission based on the one or more reception parameters associated with the priority level indicated for the scheduled DL transmission.

Aspect 12 is the apparatus of any of aspects 10 or 11, where adjusting the SL transmission includes canceling the SL transmission.

Aspect 13 is the apparatus of any of aspects 1 to 14, where the at least one processor is further configured to configure a first time-interval parameter associated with a SL resource selection if the UE is configured to report the indication of the resources selected for the SL transmission and configure a second, shorter time-interval parameter associated with a SL resource selection if the UE is not configured to report the indication of the resource selected for the SL transmission.

Aspect 14 is the apparatus of aspect 13, where the first time-interval parameter and the second time-interval parameter correspond to a threshold amount of time for an interval between a selection of resources for a SL transmission and a resource selection window.

Aspect 15 is the apparatus of aspect 15, where the first time-interval parameter and the second SL time-interval parameter correspond to an interval between the selection of resources for the SL transmission and an end of a resource selection window.

Aspect 16 is an apparatus for wireless communication including at least one processor coupled to a memory and configured to receive, in an UL transmission, an indication of resources selected for a SL transmission from a UE and transmit, based on the indication of the resources selected for the SL transmission, at least one DL transmission that overlaps in time with the SL transmission.

Aspect 17 is the apparatus of aspect 16, where the indication of the resources selected for the SL transmission includes an indication of a set of subchannels including the resources selected for the SL transmission.

Aspect 18 is the apparatus of any of aspects 16 or 17, where the at least one processor is further configured to transmit, to the UE, a configuration of a period for periodic transmission of the indication of the resources selected for the SL transmission.

Aspect 19 is the apparatus of any of aspects 16 to 18, where the at least one processor is further configured to transmit a request for an indication of resources selected for a SL transmission, where the indication of the resources selected for the SL transmission is received based on the transmitted request.

Aspect 20 is the apparatus of any of aspects 16 to 19, where the at least one processor is further configured to adjust one or more transmission parameters for transmission of the DL transmission that overlaps in time with the SL transmission.

Aspect 21 is the apparatus of aspect 20, where the at least one processor is further configured to transmit, to the UE, multiple configurations of one or more transmission parameters for a DL transmission that overlaps in time with the SL transmission, each configuration associated with a corresponding priority level and transmit a priority level indication of a priority level associated with the DL transmission that overlaps in time with the SL transmission.

Aspect 22 is the apparatus of aspect 21, where the one or more transmission parameters includes an increased transmission power, a reduced MCS, or a reduced rank.

Aspect 23 is the apparatus of any of aspects 21 or 22, where the DL transmission is transmitted based on the one or more transmission parameters associated with the priority level indicated for the DL transmission.

Aspect 24 is a method of wireless communication for implementing any of aspects 1 to 23.

Aspect 25 is an apparatus for wireless communication including means for implementing any of aspects 1 to 23.

Aspect 26 is a computer-readable medium storing computer executable code, where the code when executed by a processor causes the processor to implement any of aspects 1 to 23.

What is claimed is:

1. An apparatus for wireless communication, comprising:
   a memory; and
   at least one processor coupled to the memory, wherein the at least one processor is configured to:
   select resources for a sidelink transmission;
   transmit, in an uplink transmission to a network node, an indication of the resources selected for the sidelink transmission;
   transmit the sidelink transmission on the resources selected for the sidelink transmission; and
   receive a downlink transmission from the network node that overlaps in time with the sidelink transmission, the downlink transmission having one or more parameters adjusted based on the downlink transmission overlapping in time with the sidelink transmission.

2. The apparatus of claim 1, wherein the at least one processor is further configured to:
   transmit sidelink control information (SCI) reserving the resources selected for the sidelink transmission.

3. The apparatus of claim 1, wherein the indication of the resources selected for the sidelink transmission indicates a set of subchannels including the resources selected for the sidelink transmission.

4. The apparatus of claim 1, wherein the at least one processor is further configured to:
   receive, from the network node, an additional indication of a period for periodic transmission of the indication of the resources selected for the sidelink transmission.

5. The apparatus of claim 1, wherein the at least one processor is further configured to:
   adjust one or more reception parameters for reception of the downlink transmission based on the downlink transmission overlapping in time with the sidelink transmission.

6. The apparatus of claim 5, wherein the one or more reception parameters include an increased transmission power, a reduced modulation and coding scheme (MCS), or a reduced rank.

7. The apparatus of claim 5, wherein the at least one processor is further configured to:
   receive a configuration of the one or more reception parameters for downlink reception that overlaps with the sidelink transmission.

8. An apparatus for wireless communication, comprising:
   a memory; and
   at least one processor coupled to the memory, wherein the at least one processor is configured to:
   receive a request from a network node for an indication of resources selected for a sidelink transmission,
   select the resources for the sidelink transmission; and
   transmit, in an uplink transmission to the network node, the indication of the resources selected for the sidelink transmission wherein the indication of the resources selected for the sidelink transmission is transmitted based on the request from the network node.

9. An apparatus for wireless communication, comprising:
a memory; and
at least one processor coupled to the memory, wherein the at least one processor is configured to:
select resources for a sidelink transmission;
transmit, in an uplink transmission to a network node, an indication of the resources selected for the sidelink transmission;
receive multiple configurations of one or more reception parameters for reception of downlink transmissions that overlap in time with the sidelink transmission, each configuration associated with a corresponding priority level;
receive a priority level indication of a priority level associated with a scheduled downlink transmission that overlaps in time with the sidelink transmission; and
adjust at least one of the reception of the scheduled downlink transmission or the sidelink transmission based on the priority level indication.

10. The apparatus of claim 9, wherein the at least one processor is configured to receive the scheduled downlink transmission based on the one or more reception parameters associated with the priority level indicated for the scheduled downlink transmission.

11. The apparatus of claim 9, wherein adjusting the sidelink transmission comprises canceling the sidelink transmission.

12. An apparatus for wireless communication, comprising:
a memory; and
at least one processor coupled to the memory, wherein the at least one processor is configured to:
select resources for a sidelink transmission;
transmit, in an uplink transmission to a network node, an indication of the resources selected for the sidelink transmission
configure a first time-interval parameter associated with a sidelink resource selection if a user equipment (UE) is configured to report the indication of the resources selected for the sidelink transmission; and
configure a second, shorter time-interval parameter associated with the sidelink resource selection if the UE is not configured to report the indication of the resources selected for the sidelink transmission.

13. The apparatus of claim 12, wherein the first time-interval parameter and the second, shorter time-interval parameter correspond to a threshold amount of time for an interval between a selection of the resources for the sidelink transmission and a resource selection window.

14. The apparatus of claim 12, wherein the first time-interval parameter and the second, shorter time-interval parameter correspond to an interval between a selection of the resources for the sidelink transmission and an end of a resource selection window.

15. An apparatus for wireless communication at a base station, comprising:
a memory; and
at least one processor coupled to the memory, wherein the at least one processor is configured to:
receive, in an uplink transmission, an indication of resources selected for a sidelink transmission from a UE; and
transmit, based on the indication of the resources selected for the sidelink transmission, a downlink transmission that overlaps in time with the sidelink transmission, the downlink transmission having one or more transmission parameters adjusted based on the downlink transmission overlapping in time with the sidelink transmission.

16. The apparatus of claim 15, wherein the indication of the resources selected for the sidelink transmission indicates a set of subchannels including the resources selected for the sidelink transmission.

17. The apparatus of claim 15, wherein the at least one processor is further configured to:
transmit, to the UE, an additional indication of a period for periodic transmission of the indication of the resources selected for the sidelink transmission.

18. An apparatus for wireless communication, comprising:
a memory; and
at least one processor coupled to the memory, wherein the at least one processor is configured to:
transmit a request for an indication of resources selected for a sidelink transmission, wherein the indication of the resources selected for the sidelink transmission is received in response to the request;
receive, in an uplink transmission, the indication of the resources selected for the sidelink transmission from a user equipment (UE); and
transmit, based on the indication of the resources selected for the sidelink transmission, a downlink transmission that overlaps in time with the sidelink transmission.

19. The apparatus of claim 15, wherein the at least one processor is further configured to:
adjust the one or more transmission parameters for transmission of the downlink transmission that overlaps in time with the sidelink transmission.

20. An apparatus for wireless communication, comprising:
a memory; and
at least one processor coupled to the memory, wherein the at least one processor is configured to:
receive, in an uplink transmission, an indication of resources selected for a sidelink transmission from a UE;
transmit, based on the indication of the resources selected for the sidelink transmission, a downlink transmission that overlaps in time with the sidelink transmission;
transmit, to the UE, multiple configurations of one or more transmission parameters for downlink transmissions that overlap in time with the sidelink transmission, each configuration associated with a corresponding priority level; and
transmit a priority level indication of a priority level associated with the downlink transmission that overlaps in time with the sidelink transmission.

21. The apparatus of claim 20, wherein the one or more transmission parameters include an increased transmission power, a reduced modulation and coding scheme (MCS), or a reduced rank.

22. The apparatus of claim 20, wherein the one or more transmission parameters of the downlink transmission are associated with the priority level indicated for the downlink transmission.

23. A method of wireless communication at a user equipment (UE), comprising:
selecting resources for a sidelink transmission;

transmitting, in an uplink transmission to a network node, an indication of the resources selected for the sidelink transmission;

transmitting the sidelink transmission on the resources selected for the sidelink transmission; and receiving a downlink transmission from the network node that overlaps in time with the sidelink transmission, the downlink transmission having one or more parameters adjusted based on the downlink transmission overlapping in time with the sidelink transmission.

24. The method of claim 23, further comprising:

adjusting one or more reception parameters for reception of the downlink transmission based on the downlink transmission overlapping in time with the sidelink transmission.

25. The method of claim 24, wherein the one or more reception parameters include an increased transmission power, a reduced modulation and coding scheme (MCS), or a reduced rank.

26. The method of claim 24, further comprising:

receiving a configuration of the one or more reception parameters for downlink reception that overlaps with the sidelink transmission.

27. The method of claim 24, further comprising:

receiving multiple configurations of the one or more reception parameters for the reception of downlink transmissions that overlaps in time with the sidelink transmission, each configuration associated with a corresponding priority level;

receiving a priority level indication of a priority level associated with a scheduled downlink transmission that overlaps in time with the sidelink transmission; and adjusting at least one of the reception of the scheduled downlink transmission or the sidelink transmission based on the priority level indication.

28. A method of wireless communication at a network node, comprising:

receiving, in an uplink transmission, an indication of resources selected for a sidelink transmission from a UE; and transmitting, based on the indication of the resources selected for the sidelink transmission, a downlink transmission that overlaps in time with the sidelink transmission, the downlink transmission having one or more transmission parameters adjusted based on the downlink transmission overlapping in time with the sidelink transmission.

29. The method of claim 28, further comprising:

transmitting, to the UE, multiple configurations of the one or more transmission parameters for downlink transmissions that overlap in time with the sidelink transmission, each configuration associated with a corresponding priority level; and transmitting a priority level indication of a priority level associated with the downlink transmission that overlaps in time with the sidelink transmission.

30. The method of claim 28, wherein the one or more transmission parameters include an increased transmission power, a reduced modulation and coding scheme (MCS), or a reduced rank.

* * * * *